US011889933B2

(12) United States Patent
Cohn et al.

(10) Patent No.: US 11,889,933 B2
(45) Date of Patent: *Feb. 6, 2024

(54) RESOLVING EVENTS IN ITEM-IDENTIFYING CARTS

(71) Applicant: Amazon Technologies, Inc., Seattle, WA (US)

(72) Inventors: Jonathan Cohn, Acton, MA (US); Oded Maron, Sudbury, MA (US); Jeremy Samuel De Bonet, Southborough, MA (US); Xiang Ma, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,841

(22) Filed: Oct. 10, 2022

(65) Prior Publication Data

US 2023/0112243 A1 Apr. 13, 2023

Related U.S. Application Data

(63) Continuation of application No. 17/379,788, filed on Jul. 19, 2021, now Pat. No. 11,464,348, which is a
(Continued)

(51) Int. Cl.
*A47F 9/04* (2006.01)
*B62B 3/14* (2006.01)
*G06Q 30/0601* (2023.01)

(52) U.S. Cl.
CPC ............ *A47F 9/048* (2013.01); *B62B 3/1416* (2013.01); *B62B 3/1428* (2013.01); *G06Q 30/0635* (2013.01)

(58) Field of Classification Search
None
See application file for complete search history.

(56) References Cited

U.S. PATENT DOCUMENTS 9,117,106 B2 8/2015 Dedeoglu et al.
9,235,928 B2 1/2016 Medioni et al.
(Continued)

OTHER PUBLICATIONS

Office Action for U.S. Appl. No. 16/711,300, dated Oct. 27, 2020, Cohn, "Resolving Events in Item-Identifying Carts", 16 Pages.
(Continued)

*Primary Examiner* — Kristy A Haupt
(74) *Attorney, Agent, or Firm* — Lee & Hayes, P.C.

(57) ABSTRACT

This disclosure is directed to item-identifying carts that may be utilized by users to automatically identify items that the users place in their carts. In addition, these carts may automatically determine the outcome of respective events that occur with respect to these identified items. For example, the carts may be configured to identify one or more items that are placed into or removed from the cart, and thereafter determine one or more actions taken with respect to the identified items and a quantity of the items involved. For example, after identifying a first item and a second item either placed into or removed from the cart, the cart may determine that the user added two instances of the first item and removed one instance of the second item. In response to making this determination, the cart may update a virtual cart of a user operating the physical cart.

20 Claims, 18 Drawing Sheets

Related U.S. Application Data continuation of application No. 16/711,300, filed on Dec. 11, 2019, now Pat. No. 11,064,821.

(56) References Cited

U.S. PATENT DOCUMENTS

| | | | |
|---|---|---|---|
| 9,473,747 B2 | 10/2016 | Kobres et al. | |
| 10,769,713 B1* | 9/2020 | Townsend | G06Q 30/0635 |
| 11,064,821 B2 | 7/2021 | Cohn et al. | |
| 11,464,348 B2* | 10/2022 | Cohn | G06Q 20/4014 |
| 2004/0073489 A1* | 4/2004 | Varatharajah | G06Q 20/20 |
| | | | 705/16 |
| 2013/0284806 A1 | 10/2013 | Margalit | |
| 2017/0046774 A1 | 2/2017 | Azuma | |
| 2019/0057435 A1* | 2/2019 | Chomley | B62B 3/14 |
| 2019/0279185 A1* | 9/2019 | Cheng | B62B 5/0096 |
| 2021/0177163 A1 | 6/2021 | Cohn et al. | |
| 2021/0345794 A1 | 11/2021 | Cohn et al. | |

OTHER PUBLICATIONS

Office Action for U.S. Appl. No. 17/379,788, dated Apr. 4, 2022, Cohn, "Resolving Events in Item-Identifying Carts", 5 pages.
The International Preliminary Report on Patentability for PCT Application No. PCT/US20/64517, dated Jun. 23, 2022 8 pages.

* cited by examiner

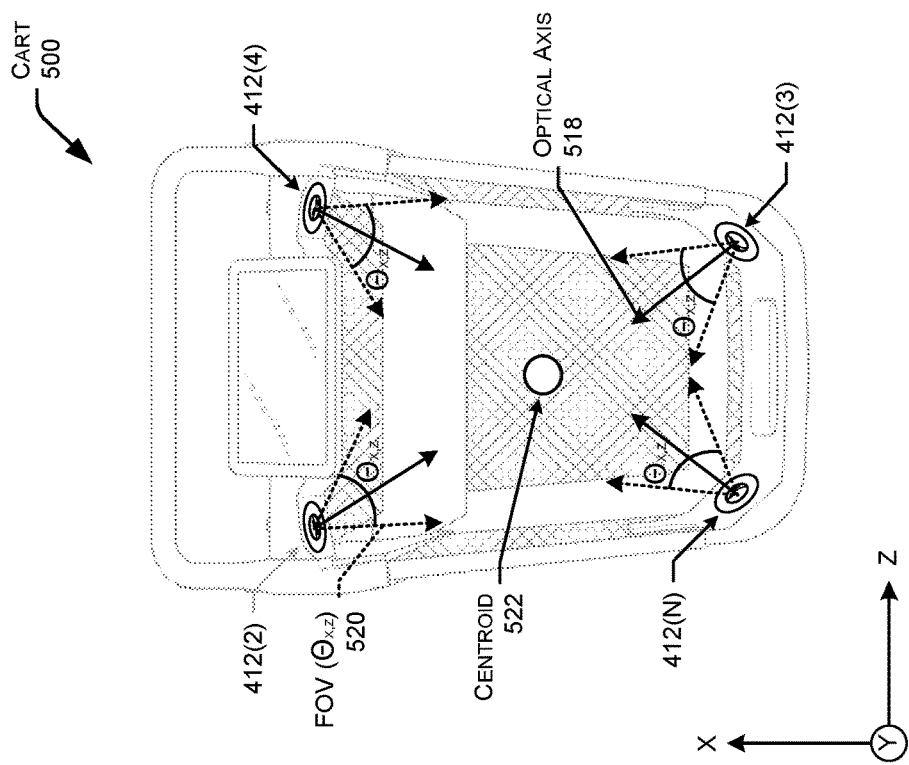
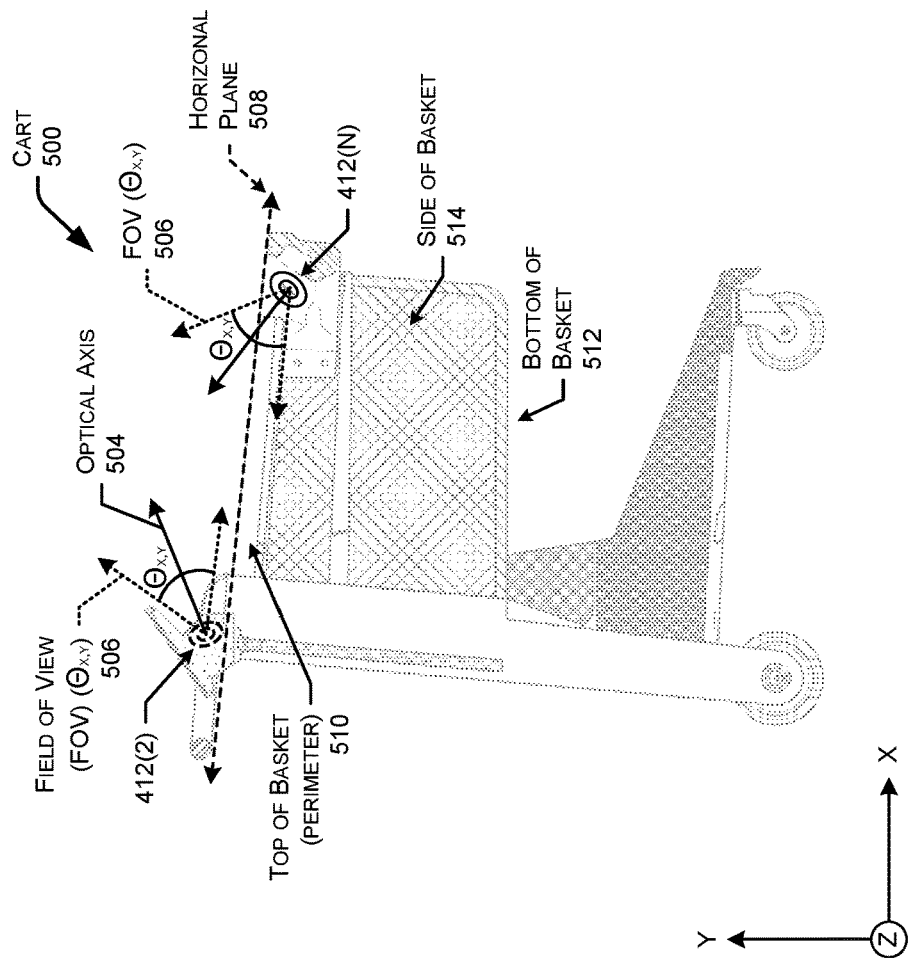
FIG. 5B
FIG. 5A

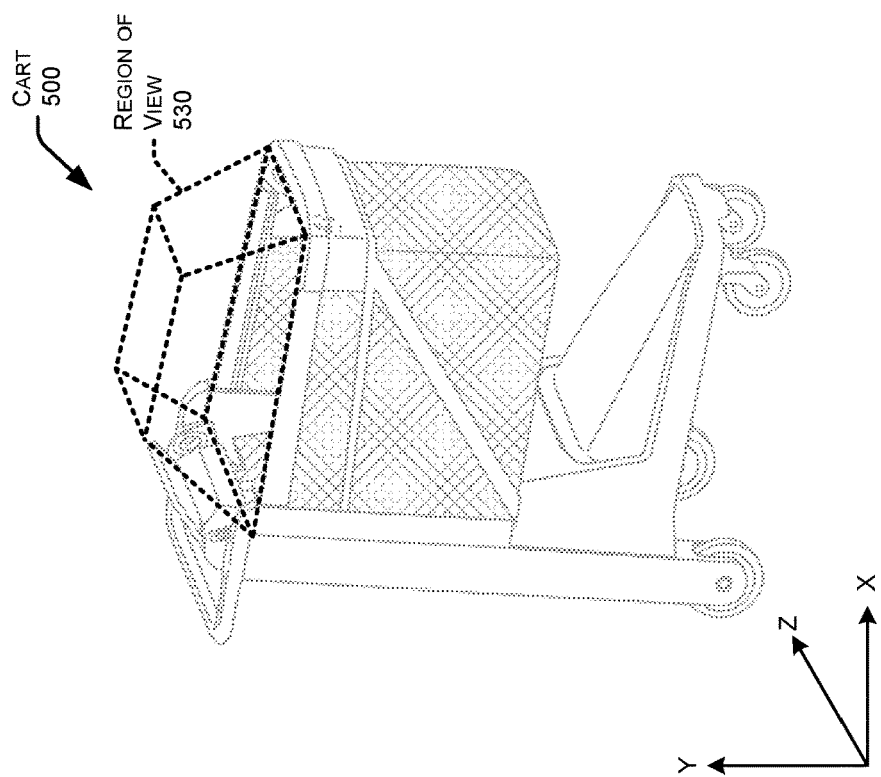
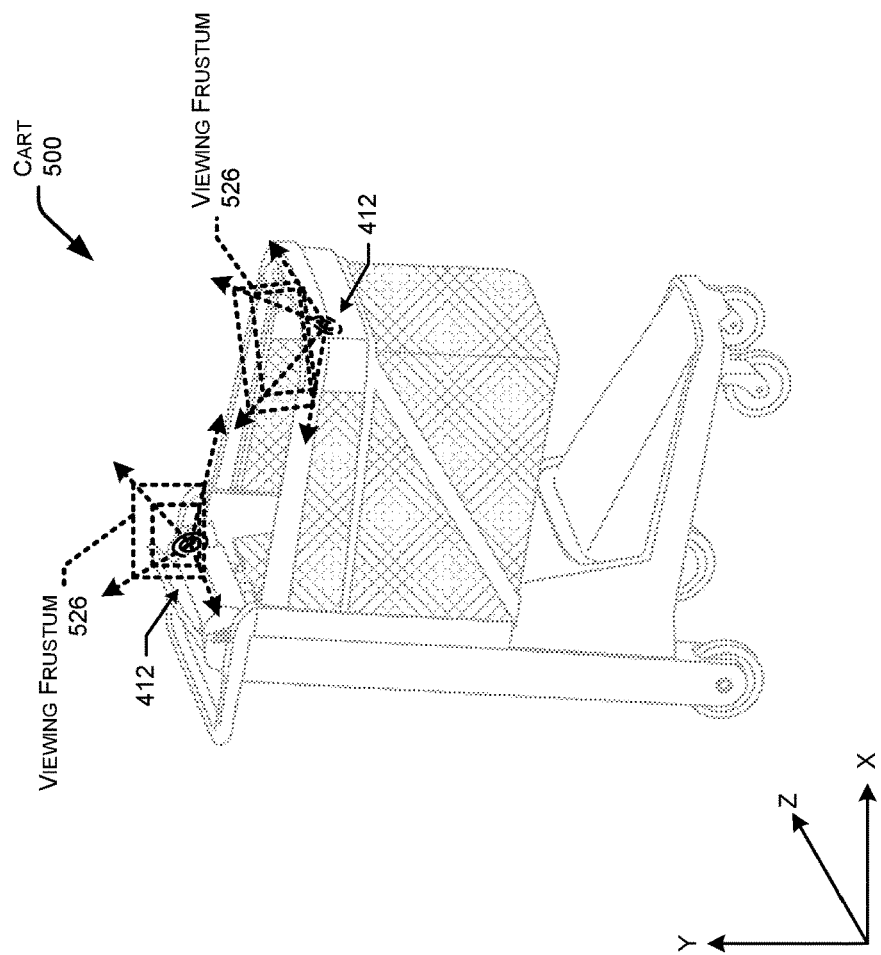

RESOLVING EVENTS IN ITEM-IDENTIFYING CARTS

RELATED APPLICATIONS

This application claims priority to and is a continuation of U.S. patent application Ser. No. 17/379,788, filed on Jul. 19, 2021, which claims priority to and is a continuation of U.S. patent application Ser. No. 16/711,300, filed on Dec. 11, 2019, the entire contents of which are incorporated herein by reference.

BACKGROUND

Materials handling facilities, such as warehouses or retail stores, often provide users with carts to facilitate the processes by which the users locate, identify, retrieve, and transport items at the facilities. For example, when a user identifies an item that he or she desires on a shelf or other location within a materials handling facility, the user may remove the item from the shelf or other location, and place the item into a receptacle of a cart before the user continues to travel through the facility in search of additional items. The cart may have a durable frame or structure that is configured to travel on wheels such that users are able to fill the carts with numerous, and potentially heavy, items they desire, and use the mobile cart to transport the items around the materials handling facilitate with ease, rather than having to carry the items.

Traditionally, when the user has finished identifying and retrieving the items he or she desires, the user may transport the items in the cart to a check-out destination within the materials handling facility, such as a distribution station, a cashier, or a dedicated self-checkout stand, and transition the items to a human operator or an automated agent. Typically, the user or the human operator manually removes the items from the cart, scans or otherwise registers the items with the user, and places the items into one or more bags or other item carriers. The user may then use the bags or other item carriers to transport the items to another destination (e.g., to an automobile, workstation, or home) by manually carrying the item carriers to the other destination, or by transporting the item carriers to the destination within the cart.

Thus, retrieving items from shelves or other locations within a materials handling facility, and placing the items into bags or other carriers for transportation to their desired destination (e.g., automobile or home), may be a two-step process. First, the items must be retrieved from the shelves or other storage locations and placed into the cart, and second, the items must be removed from the cart, scanned, and placed into a bag or other item carrier. These intervening actions that are required to transition items from a shelf or other storage location into the bags or other item carrier necessarily slows the process by which items are retrieved from a materials handling facility, and tend to mitigate the advantages that carts provide.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 further illustrates a process that the cart may implement for providing feedback to a user of the cart that an item placed into the cart has been identified and, thereafter, feedback identifying a determined result of an event involving the identified item.

FIGS. 5A-5D illustrate example views of an item-identifying cart that has one or more cameras for identifying items placed in the cart.

DETAILED DESCRIPTION

Figure 1:
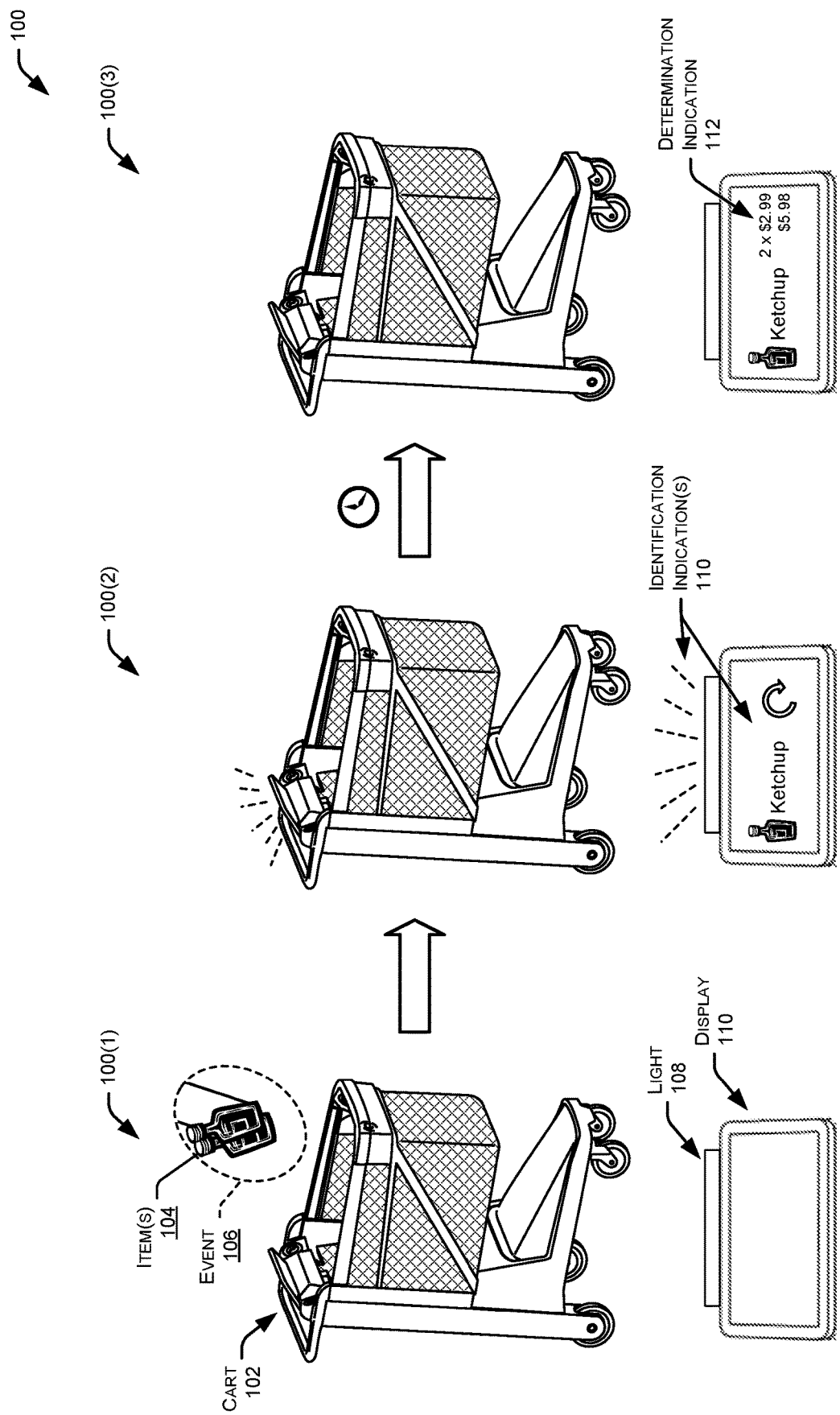
FIG. 1 illustrates an example sequence of operations in which a user places an item into an item-identifying cart, which identifies the item using image data generated by one or more cameras mounted to the cart. In response to identifying the item, the cart outputs one or more indications indicating that an item has been an identified. Sometime thereafter, the cart uses weight data generated by one or more weight sensors of the cart to determine an outcome of an event involving the identified item, such as an action related to the item (e.g., take or return) and a quantity involved.

This disclosure is directed to item-identifying carts that may be utilized by users in material handling facilities to automatically identify items that the users place in their carts as they move around the material handling facilities. In addition, these carts may automatically determine the outcome of respective events that occur with respect to these identified items. For example, the carts may be configured to identify one or more items that are placed into or removed from the cart, and thereafter determine one or more actions taken with respect to the identified items and a quantity of the items involved. For example, after identifying a first item and a second item either placed into or removed from the cart, the cart may determine that the user added two instances of the first item and removed one instance of the second item. In response to making this determination, the cart may update a virtual cart of a user operating the physical cart to indicate an addition of two instances of the first item and to remove an instance of the second item from the virtual cart.

In some instances, the item-identifying cart (or "smart cart") may include one or more cameras for generating image data, which the cart may thereafter analyze to identify one or more items represented in the image data. After identifying one or more items, the cart may provide feedback to a user operating the cart to indicate that one or more items have been identified. For example, upon a user placing an item into or removing an item from the cart, the cart may generate image data, identify the item, and cause one or more output devices on the cart (or otherwise) to output an indication that the item has been identified. For example, the cart may cause a lighting element on the cart to turn a predefined color (e.g., green) or to illuminate in a predefined lighting sequence. In addition, or in the alternative, the cart may cause a display located on the cart to present data identifying the item, thus indicating to the user that the cart has successfully identified the item that has been placed into or removed from the cart. In still other instances, the cart may cause one or more other displays or output devices (e.g., a mobile phone of the user) to output one or more indications, which may be audible, visual, and/or the like. In still other instances, the cart may cause one or more speakers (on the cart or otherwise) to output an audible tone or other sound indicating that the item has been identified.

Furthermore, sometime after identifying the item(s) and providing feedback to the user that the item(s) have been identified, the cart may attempt to determine the outcome(s) of event(s) involving the identified item(s). For example, after identifying an item placed into or removed from a basket of the cart, the cart may attempt to determine an action taken with respect to the item, such as whether the item placed into the cart (e.g., a "take") or whether the item was removed from the cart (e.g., a "return"). In addition, the cart may attempt to determine a quantity of the items involved, such as whether one, two, or any other number of instances was placed into the cart or removed from the cart. Furthermore, in some instances, the outcome of a particular event may involve multiple identified items and quantities. For instance, after identifying a first item and a second item, the cart may determine that two instances of the first item were added to the cart, while one instance of the second item was removed from the cart. Of course, while an example is provided, it is to be appreciated that the cart may determine any other number of items and any other quantity with respect to these identified items.

After both identifying one or more items and determine outcomes of events involving these items, the cart may provide feedback to the user operating the cart that the outcome has been determined. For example, the cart may cause the display to be updated to present data indicating the determined actions as part of a virtual cart representing a listing of items acquired by the user during a current shopping session. For instance, the display may present data updating the virtual cart of the user to indicate that two instances of the first item have been added to the cart, while one instance of the second item has been removed. Furthermore, the cart may provide other forms of visual and/or audible feedback to the user indicating that the virtual cart has been updated.

In some instances, the smart cart may determine the action(s) taken with respect to the identified item(s) and may determine the quantities involved based at least in part on weight data generated by one or more weight sensors of the cart. For example, the cart may include one or more weight sensors configured to generate weight data indicating a current weight of the basket of the cart. In some instances, after one or more items have been identified (e.g., using image data generated by the one or more cameras), the cart may analyze the weight data generated by the weight sensors to determine the action(s) taken with respect to the item(s). In some instances, prior to analyzing the weight data to determine the action(s), the cart may wait until the weight reading of the weight sensors has stabilized in order to ensure an accurate weight measurement. That is, the cart may determine when the weight data generated by the weight sensors has not changed by more than a threshold amount (e.g., 5%, 5 grams, etc.) for a predefined amount of time (e.g., 3 seconds). In some instances, the threshold amount may vary based on one or more factors, such as the current weight of the cart, the change in the weight of the cart in response to the cart receiving an item, whether the cart is moving or stationary, or the like. For example, if the cart senses a slight weight change (e.g., because a relatively light item has been placed into or removed from the cart), the threshold value may be relatively small such that the cart will determine that the weight has stabilized if the weight of the basket does not change by this relatively small amount for a predefined amount of time. Conversely, if the cart senses a relatively large change (e.g., because a relatively heavy item has been placed into the cart), the threshold value by relatively large such that the cart will determine that the weight has stabilized if the weight of the basket does not change by this relatively large amount for a predefined amount of time. Similarly, the predefined amount of time may vary based on similar or different factors.

After the weight has stabilized, the cart may determine a change in weight equal to a weight of the basket prior to the identification of the item(s) and the current, stabilized weight. After determining the weight change, the cart may use this weight-change and the identity of the identified item(s) to determine action(s) taken with respect to the item(s) and the quantities involved. For example, the cart may access an item catalog that associates item identifiers with respective weights and may use these "catalog weights" to determine the actions.

For example, envision that the cart has identified two items using the image data generated by the cameras, that the weight-change data indicates that the basket weight has increased by 600 grams, and that the catalog weights of the first and second items are 285 grams and 400 grams, respectively. Based on this information, the cart may determine that the outcome of the event relating to these two identified items is that a user operating the cart placed one instance of the first item and one instance of the second item into the basket of the cart (explaining the 600-gram increase). As such, the cart may update a virtual cart associated with the user and provide feedback to the user, such as on a display of the cart, on a mobile device of the user, or the like.

In another example, envision that the cart identifies two items having catalog weights of 250 grams and 300 grams respectively and that the virtual cart of the user currently indicates that the user has previously taken one instance of the second item. Envision further that the weight-change data indicates that the basket has lightened by 50 grams. Based on this information (i.e., the weights of the identified items, the current contents of the virtual cart, and the weight-change data), the cart may determine that the user has added one instance of the first item to the basket and removed one instance of the second item. Thus, the cart may update the virtual cart to indicate the addition of the first item and the removal of one instance of the second item. In some instances, the cart may update the display to provide this feedback to the user.

In some instances, the smart carts described herein may include one or more cameras for identifying items and one or more cameras to identify the users operating the carts. Upon identifying a user operating a cart and items placed into the cart, the item-identifying cart may update a virtual shopping cart of the user to represent the items that have been placed in, or removed from, the physical cart, using the techniques introduced above and described in detail below. According to the techniques described herein, an item-identifying cart (or "smart cart") may include one or more first cameras positioned on a frame of the cart and directed substantially toward a position typically occupied by a user pushing the cart to generate first image data for identifying the user. For example, the first image data may represent an identifier associated with an account of the user displayed on a mobile device of the user (e.g., a barcode or the like displayed on a mobile phone), biometric-recognition data representing the user, gesture data representing the user, and/or the like. The cart may include components for associating the first image data with the user, or the cart may send the first image data to one or more remote servers for determining this association.

In addition, the cart may include one or more second cameras positioned on the frame of the cart to generate second image data representing items that a user places in the cart, and/or removes from the cart. The cart may include one or more components that analyze the image data to determine an item identifier for the item(s) placed in the cart, or removed from the cart, and update a virtual shopping cart for the user of the cart. Once a user has finished their shopping session, the user may be able to efficiently checkout of the materials handling facility (or "facility") without having to scan or otherwise register their items with a cashier or at a designated self-checkout stand. In some examples, the user may simply depart the facility with their items and entirely avoid a traditional checkout experience of a facility, such as a grocery store. For instance, the user may have registered for a user account with the facility that is automatically charged for purchases of the items listed in a virtual shopping cart of the user that were identified by the cart during the user's shopping session.

Similar to traditional carts, such as shopping carts commonly found at grocery stores or other retail establishments, the item-identifying carts described herein may include a durable frame, including or supporting a basket, made of plastic or metal (often having four sides in a quadrilateral shape), multiple wheel castors configured to allow the cart to move on a surface, and one or more handles for a user to push and/or pull the cart around in a facility. However, the carts described herein may include additional hardware and software components that configure the carts to, among other functions, identify items placed in the carts on behalf of the users, and update virtual carts of the users to automate one or more steps of a traditional shopping experience.

For example, an item-identifying cart may include one or more cameras (or other imaging sensors), memory that stores software components for identifying users and/or items and for performing other operations for managing virtual shopping carts, at least one processor to execute the software components, and at least one battery to power the components of the cart. The camera(s) may include one or more first cameras positioned on the frame toward a location where a user would typically push the cart. The one or more first cameras may generate first image data, such as image data of a mobile phone of a user representing visual indicia (e.g., a barcode) associated with an account of the user. Thus, the user may hold up his or her mobile device representing the visual indicia such that the first camera(s) may scan or otherwise generate the first image data. The cart may then identify the account of the user using the first image data or may send the image data to a remote server(s), which may identify the user account using the first image data. Thus, items placed into the cart during a shopping session of the user operating the cart may thereafter be associated with the user account.

In some instances, the smart cart may also include one or more displays, which in some instances may reside adjacent the first camera(s) such that the display is viewable by the user operating the cart. The display may present content that is customized for the user at least partly in response to the cart identifying the user via the first image data. For example, upon the cart or the remote server(s) identifying the user operating the cart, the display may present information associated with the user, such as a shopping list of the user, a name of the user, account information associated with the account of the user, and/or the like. Furthermore, in some instances the display may present location-specific information. For example, if the cart determines that it is located in a particular location of a store, such as near a produce section, the display may present information regarding the particular location, such as cost of produce items near the cart. In another example, the display may present information such as promotions occurring on items that reside adjacent the location of the cart. In some instances, the presented promotions may also be determine based on information associated with the user (e.g., a past purchase history, preferences, etc.), current contents of the cart, and/or the like.

In some instances, upon the cart identifying an item using image data generated by the one or more cameras, the display may present item-identifying information (e.g., name, picture, etc.) on the display, thus providing feedback indicating that the item has been identified. However, until the cart can determine the action taken with respect to the identified item and/or the quantity involved, the display may present data indicating that the cart is still processing the event. For example, the display may present, adjacent the item-identifying information, an icon (e.g., a spinning circle, etc.) indicating that the cart is still attempting to determine the outcome of the event involving the item. Upon determining the outcome, such as the item being placed into or removed from the cart, as well as the quantity of the item involved with the take or return, the cart may cause the display to present data indicating the action and the quantity. For example, the cart may update the virtual-cart data presented on the display.

In addition to the cameras positioned towards the user operating the cart for identifying the user, the smart cart may further include one or more second cameras positioned on the frame of the cart such that an optical axis of the second camera(s) is directed towards a location where second image data generated by the second camera(s) represents or captures items that are placed in the cart, and removed from the cart, by a user. The second image data may be analyzed by the software component(s) of the cart, and/or by remote server(s), using one or more image processing techniques, such as text recognition, object recognition, and/or any other technique. The software component(s) may thus identify or determine item identifiers for the items represented in the image data.

As described below, the cart may include a frame that defines a basket to receive the items. The frame may couple to one or more weight sensors (e.g., load cells, etc.) configured to generate weight data indicative of a current weight of the basket. In some instances, upon the cart identifying an item via the image data generated by the cameras directed substantially towards the basket, the cart may determine a weight change that occurs before and after identification of the item. For example, the cart may initially wait until the weight reported by the weight sensors stabilizes and may thereafter determine a change in weight between the current, stabilized weight and a previous weight of the basket prior to the item identification. The cart may then determine, from an item catalog, the weight of the identified item (and the weight of any other items identified in the time period between the last reported weight and the current weight) and may provide this information to an event-determination component. The event-determination component may also receive the weight-change data and information about the current contents of the user's virtual cart and may use this received data to determine an outcome of the event. After doing so, the cart may update a virtual shopping cart for the user's shopping session (e.g., add an item to a list of items to be purchased by the user, or remove an item from the list of items to be purchased). In this way, the cart may identify and track items that are retrieved from different locations within the facility and, after determining the outcomes of events associated with these items, may maintain a virtual shopping cart, or virtual list, of the items selected by the user to provide a more seamless and efficient checkout experience for the user.

In some examples, the cart may have a frame that defines a basket comprising a bottom having quadrilateral shape, one or more (e.g., four) sides protruding from the bottom to define an interior cavity, and a top having a perimeter that defines an opening to receive items placed in the interior cavity of the basket. One or more second cameras may be positioned on the basket of the cart to generate image data representing the items placed in the cart. In some examples, the cameras may be included in respective capture assemblies that include other components, such as light sources (e.g., light emitting diodes (LEDs)) to active and emit light on the items such that the items are illuminated in the image data to help improve processing of the image data to identify the items. In other instances, the cameras may reside adjacent the light sources.

Although the cameras may be positioned anywhere on the cart, in some examples, the basket of the cart may have cameras disposed proximate to each of the four corners of the perimeter of the top of the basket. In this way, the entire cart may be represented in the various field-of-views (FOVs) of the cameras, which also may not be obstructed as the basket of the cart fills up with items. The cameras may, in some examples, be internal to the basket, or otherwise define a relatively small protrusion from the form-factor of the basket, such that the carts may still be capable of "nesting" together in a line when stored at a facility, similar to traditional shopping carts.

Due to the battery life constraints of the cart, it may be advantageous to refrain from having the cameras and/or light sources operating for large periods of time to detect an image being placed in the cart. Thus, in some examples the cart may additionally include one or more proximity sensors (e.g., time-of-flight (ToF) sensors, passive infrared (PIR) sensors, etc.) that generate sensor data to detect movement of an item in, or out, of the cart while the cameras and light sources are de-activated or in a low-power state. In this way, proximity sensors, which may consume less power than the cameras and/or light sources, may detect movement proximate the cart before the cameras and/or light sources are activated.

Thus, the cart described herein may include four cameras disposed at or proximate to the four corners of the perimeter of the basket of the cart. To detect items placed in the cart, or removed from the cart, the cameras may have respective optical axes (e.g., imaginary line along which light propagates through the camera) that are oriented towards an interior of the perimeter of the top of the cart (e.g., towards the middle or centroid of the perimeter of the cart). By orienting the cameras inward with respect to the perimeter of the top of the cart, only items that pass through (e.g., in or out) of the opening of the basket may be represented in image data of the cameras.

The cameras may additionally be oriented to face in a particular vertical direction. For instance, the optical axes of the cameras may, in some examples, be directed downward towards the bottom of the basket to identify when items are placed in the bottom of the basket or taken from the bottom of the basket. For example, some of the carts described herein may include an over-the-basket structural element that couples to a left side and a right side of frame, with a middle portion of this structural element including a camera having an FOV directed substantially downwards into the basket. In addition, this over-the-basket element further include one or more light sources (e.g., LEDs) directed downwards and, in some instances, one or more lighting elements that a user or associate of the facility may selectively turn on to indicate different states of the cart, such as a state in which a user is requesting assistance, a state in which an age of the user is to be verified prior to sale of an item placed into the cart, and/or the like.

However, because users of the carts may not need to remove items from the cart to be scanned before leaving the facility, it may be advantageous for users to place one or more bags, or other item carriers, in the cart before their shopping session. In this way, users may simply retrieve items from shelves or other storage locations during their shopping session, place the items directly into their bags/item carriers, and remove the bags/item carriers from the carts once they have finished their shopping session for a more seamless shopping experience. Accordingly, the basket of the cart may be sized such that one or more bags provided by the facility, and/or by the users themselves, fit efficiently in the bottom of the basket to help maximize storage space of the interior cavity the cart. In such examples, the bags/item carriers may at least partially occlude the FOVs of the cameras such that the items are difficult or impossible to identify using image data from the cameras. Further, in some instances, one or more bag clips may be positioned outside a left and right side of the frame, respectively, for securing one or more bags in the basket. For example a first strap of a bag may extend over the top of the frame and may attach to a first bag clip on the outside of a left side of the frame, while another strap of the bag may extend outside the basket and attach to a second bag clip outside a right side of the frame. Thus, a user may place items into the bag and, upon completing the shopping session, may remove the straps from the respective bag clips to acquire the items. Again, the bag may reside in the basket in a way that does not occlude the FOVs of the cameras directed substantially towards the interior of the basket.

In some examples the optical axes of the cameras may be directed upward relative to the top of the basket of the cart. For example, the top of the basket of the cart may be disposed in a substantially horizontal plane. The optical axes of the cameras may be directed along the horizontal plane, or upward relative to the horizontal plane, such that the proximity sensors detect the items, and the cameras generate image data representing the items, while the items are at or above the top of the basket (and prior to being placed in a bag or other item carrier). Accordingly, the optical axis of the four example cameras may be directed towards an interior of the perimeter of the top of the basket (e.g., towards a middle or centroid of the perimeter of the basket), and upward relative to a horizontal plane in which the top of the basket is disposed. In this way, the FOVs for each of the cameras may at least partially overlap at a location above, and potentially central to, the perimeter of the top of the cart to define a "sweet spot" or "target zone" where items are detected and/or captures by all four of the cameras.

To utilize a smart cart as described above, a user may have registered for a user account with an operator of the facility to utilize various automated management services provided by an operator of the facility. For instance, the user may have registered for a user account to automate payments made for items taken by the user and included a payment means (e.g., credit card, bank account number, etc.), and may have also provided an identification means such that the facility, or carts, can recognize the user. For instance, the user may have registered to identify themselves to the cart using any identification technique, such as presenting an identification means to the first camera/scanner positioned on the frame of the cart (e.g., presenting a driver's license, presenting a facility-issued card, presenting a user identifier via a mobile phone, etc.), speaking a predefined utterance (e.g., a name of the user, a predefined keyword, etc.), and/or biometric information that may be used recognition. Once a user has identified themselves to a smart cart, the user may begin a shopping session where the smart cart identifies and track items retrieved by the user and placed in the smart cart.

In examples where the smart cart includes proximity sensors, the smart cart may continuously operate the proximity sensors to detect movement of items above the top of the cart. The proximity sensors may generate sensor data that indicates whether an item or object is with a threshold range of distances from the top of the cart (e.g., within 6 inches, within 1 foot, within 2 feet, etc.). The sensor data may be analyzed to detect an item above the perimeter of the top of the cart and trigger the light sources to begin illuminating light and the cameras to begin generating image data. The image data generated by the second camera(s) may be analyzed by the software components to determine whether or not an item is being placed in the cart or removed from the cart. For instance, the image data may represent, over time, movement of the item into the cart, or out of the cart. Additionally, the image data may be analyzed using various techniques to determine an item identifier. Various techniques may be utilized to process image data for identifying the item identifier of the item, such as text recognition, object recognition, and/or other techniques. Upon determining the item identifier, such as determining that the item corresponds to "Strawberry Yogurt," the software components on the cart may store an indication that the item identifier was added to the cart, or removed from the cart, and update a virtual shopping cart accordingly.

After the user has moved throughout the materials handling facility and selected the items they desire to purchase or otherwise take from the facility, the user may end the shopping session in various ways. For instance, the user may return the cart to a cart corral, provide input to the cart indicating an end of the shopping session (e.g., utterance, utilize a user interface element on a touch display, etc.), or simply remove their bags or other item carriers from the cart and leave the facility. After the user has ended their shopping session, the list of item identifiers in the virtual shopping cart may be uploaded to one or more remote servers that manage user accounts for users of the facility. The servers may charge the appropriate user account for the listing of the items in the virtual shopping cart that the user took from the facility.

Although some of the techniques described below are performed locally on the cart, in other examples, some or all of the techniques may be performed by one or more backend devices or servers associated with the facility. For instance, the sensor data and/or image data may be collected at the cart and sent over network(s) to backend devices at the facility, or server devices located remote from the facility, to be processed remotely. However, in some instances it may be advantageous for at least some of the processing to be performed on the cart to reduce latency in identifying items placed in the cart. For instance, it may be advantageous to have low latency when requesting that a user provide feedback to help identify an item recently placed in the cart, rather than the user continuing their shopping session and being asked later about an item. Further, while various techniques described below are with reference to purchasing items in a retail facility, the techniques are generally applicable to any materials handling facility in which a user may place items in a cart. For example, although the techniques described herein are primarily with reference to identifying items placed in a cart by a user for the purpose of identifying a user account to charge for items selected from a materials handling facility, the techniques are equally applicable to any industry in which user recognition may be helpful. For instance, the idem-identifying cart may be implemented for distribution centers where employees collect items from various locations to be shipped through the mail system.

The following description describes use of the techniques within a materials handling facility. The facility described herein may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example sequence of operations 100 in which an item-identifying cart 102 identifies one or more items 104 that are placed into or removed from the cart 102, provides feedback to a user operating the cart indicating that the item(s) have been identified, determines an outcome of an event involving the identified item(s) 104, and updates a virtual cart of a user in response.

At a first operation 100(1), a user places one or more items 104 into a basket of the illustrated cart 102. In the illustrated example, the user places two instances of a common item 104 into the basket, although in other examples the user may place into or remove from the basket any other quantity of any other number of items. In some instances, the cart 102 may include one or more cameras directed substantially towards the basket for generating image data of an event 106 involving the item(s) 104. That is, in response to detecting the event 106 (e.g., the user placing into or removing items from the cart 102), the cameras of the cart may generate the image data. Furthermore, while this example describes cameras onboard the cart 102 generating the image data of the event 106, in other instances one or more cameras in an environment of the cart 102 (e.g., one or more overhead cameras) may generate the image data.

Regardless of the location of the cameras, the cart (or another device communicatively coupled to the cart 102) may analyze the image data to identify the item(s) 104 associated with the event 106. For example, the cart 102 may perform image processing on the image data to identify the item(s) 104 via recognition of a barcode on the item(s), by visual characteristics of the item(s), and/or the like.

Furthermore, in response to identifying the item(s), the cart 102 may provide, at an operation 100(2) and to the user operating the cart 102, feedback in the form of one or more identification indications 110 indicating that the cart 102 has identified the item(s) 104. For example, one or more lighting elements 108 coupled to a frame of the cart 102 may illuminate in a predefined color or according to a predefined light sequence to indicate that the item 104 has been identified. In addition, or in the alternative, a display 110 coupled to a frame of the cart 102 may present data indicating that that the item 104 has been identified. In some instances, the lighting element 108 may present a predefined color in response to identifying the item (e.g., green), while the display 110 may present a picture of the identified item and/or text indicating the identified item. In the illustrated example, for instance, the display may present text indicating that the cart 102 has identified "ketchup", along with a picture of the identified ketchup. In addition, the display may present data (e.g., an icon) indicating that the cart 102 is still processing the event 106 to determine an outcome of the event 106. While FIG. 1 illustrates visual feedback, in other instances the feedback may include audible feedback, such as an audible sound or other tone on a speaker of the cart or other device (e.g., a mobile phone of the user operating the cart).

At an operation 100(3), however, and sometime after presenting the identification indication(s) 110, the cart 102 may determine an outcome of the event 106. For example, the cart 102 may determine, based on weight data generated by one or more weight sensors of the cart 102, an amount of weight change in the basket of the cart between the time of identifying the item at the operation 100(2) and a prior time, such as a weight of the basket at a previous time that the virtual cart of the user was updated. In addition, the cart 102 may retrieve, from an item catalog, a known weight associated with the identified item(s) 104 and may attempt to determine the outcome of the event 106. For example, the cart 102 may analyze the weight-change data, any known weights associated with the identified item(s), the current contents of the cart 102 (as known to the cart via a virtual cart of the user), and/or the like to determine the most likely outcome of the event 106.

In this example, the cart 102 determines, based on the weight-change data and the weight of the identified ketchup as indicated by the item catalog, that the user has added two instances of the ketchup to the cart 102. Thus, the display 110 presents a determination indication 112 indicating a result of the event 106. As illustrated, the cart 102 has updated the virtual cart of the user to indicate the addition of the two bottles of ketchup and presented an indication 112 of such on the display 110.

Figure 2:
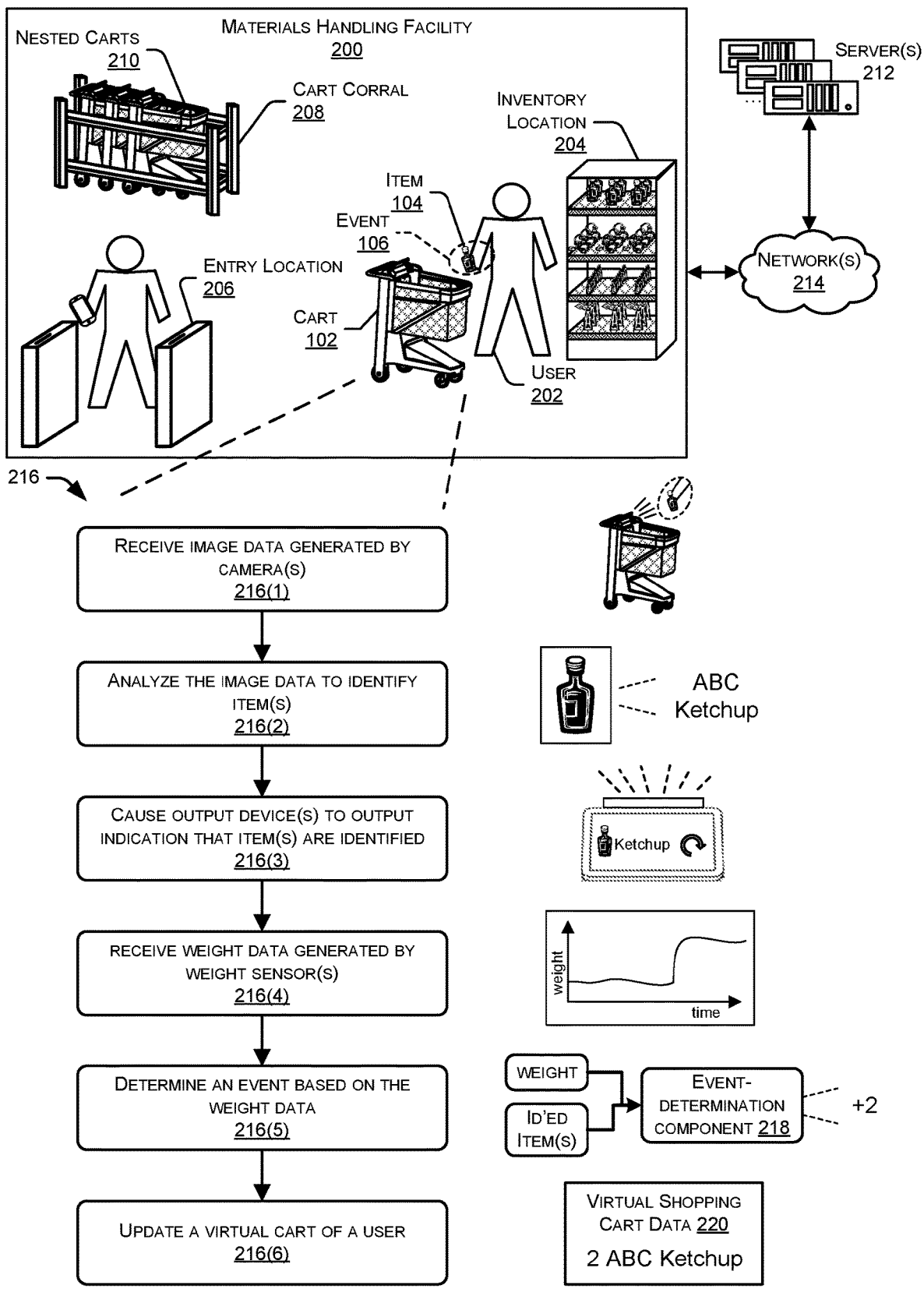
FIG. 2 illustrates an example environment of a materials handling facility that includes the item-identifying cart of FIG. 1 to identify items placed in, and removed from, a basket of the cart by a user.

FIG. 2 illustrates an example environment of a materials handling facility 200 that includes the item-identifying cart 102 of FIG. 1 to identify items placed in, and removed from, a basket of the cart by a user 202. FIG. 2 further illustrates a process 216 that the cart may implement for providing feedback to the user 202 of the cart that an item 104 placed into or removed from the cart has been identified and, thereafter, feedback identifying a determined result of an event involving the identified item.

As FIG. 2 depicts, the user 202 may have engaged in a shopping session in the materials handling facility 200. For instance, the user 202 may have selected an item 104 from an inventory location 204 (e.g., shelf, aisle, etc.) and placed the item 104 in the cart 102 (e.g., shopping cart). The inventory location 204 may house one or more different types of items 104 and the user 202 may pick (i.e., take, retrieve, etc.) one or more of these items 104.

As illustrated, the materials handling facility 200 (or "facility") may have one or more entry locations 206, such as lanes. The entry location 206 may be defined by a gate in some examples and may include a movable barrier to control movement of users 202. For example, the gate may include computer-controlled panels that may be closed to impede passage of the users 202 or opened to permit passage of the user 202. Upon entering a facility 200, a user 202 may desire to utilize a cart 102 for their shopping session to transport items 104 around the facility 200 during their shopping session. In such examples, the user 202 may approach a cart corral 208, or other locations, at which carts 102 are stored. In some examples, the cart corral 208 may comprise a structure, such as an aisle, for storing nested carts 210.

Generally, two or more of the carts 102 may be configured to nest or otherwise functionality join with one another, so that the carts 102 may be easily stored in a cart corral 208, and/or transported in bulk. In some examples, the cart corral 208 may provide additional functionality beyond storage. For instance, the cart corral 208 may facilitate charging of the nested carts 210 that are in the cart corral 208. For instance, the cart corral 208 may have various electrical contacts extending along the length of a horizontal and/or vertical member of the corral 208 that, when placed in electrical contact with an electrical contact of the nested carts 210, charge one or more batteries of the nested carts 210. In other examples, power cords may extend from the cart corral 208 that may be plugged into the nested carts 210 to recharge batteries of the nested carts 210 while not in use.

To utilize a cart 102, a user 202 may approach an unused cart that is not currently engaged in a shopping session (e.g., a nested cart), and interact with the unused cart 102 to identify themselves to the cart 102 and begin a shopping session. For instance, the carts 102 may include a first imaging device 412(1) (e.g., an image sensor such as a camera, photodetector, or other sensing apparatus designed to read a one or two-dimensional barcode) such that when a user 202 presents a user device, or portion thereof, such as the display, to the imaging device, the cart 102 may identify the user and corresponding user account for a shopping session. Other types of interaction may be performed by a user 202 to identify themselves to a cart 102 (e.g., uttering a name or other keyword to identify the user 202, typing in a password or other user information into a display of the cart 102, and/or any other type of user identification technique).

Once a user has identified themselves to the cart 102, the item-identifying functionality of the cart 102 may be activated such that subsequent items 104 placed in the cart 102 will be identified by the cart 102 and added to a virtual shopping cart for the user 202. As illustrated, a user 202 may move the cart 102 around the facility 200 to one or more inventory locations 204. The user 202 may retrieve items from the inventory location 204 and place the items 104 in the cart 102. Additionally, the use 104 may retrieve items 104 from the cart 102 and put the items 104 back in an inventory location 204, such as when the user 202 changes their mind regarding their desire to purchase or otherwise acquire the item 104. The cart 102 may include various components for identifying item identifiers corresponding to the items 104 placed in the cart and maintaining a virtual shopping cart for the shopping session of the user 202.

Once the user 202 has finished their shopping session, the user 202 may end the shopping session in various ways. For instance, the user 202 may return the cart 102 to the cart corral 208, provide input to the cart 102 indicating an end of the shopping session (e.g., utterance, utilize a user interface element on a touch display, etc.), or simply remove item bags or other item carriers from the cart 102 and leave the facility 200. After the user 202 has ended their shopping session, the list of item identifiers in the virtual shopping cart may be uploaded to one or more remote servers 212, over one or more networks 214, that manage user accounts for users 202 of the facility 200. The server(s) 212 may charge the appropriate user account for the listing of the items in the virtual shopping cart that the user took from the facility 200. For instance, the server(s) 212 may be configured to determine or generate information indicative of a cost of the items 104 picked by the user 202. Additionally, the server(s) 212 may store payment information (e.g., credit card information, bank account information, etc.) for each user account. In this way, when the user 202 finished their shopping session and the cart 102 sends the listing of item identifiers in the virtual shopping cart over the network(s) 214 to the server(s) 212, the server(s) 212 may be configured to determine a cost or price for all of the listed item identifiers, and charge the user via their payment information for the items 104 selected during their shopping session. In this way, the user 202 need not go through steps of a traditional check-out experience (e.g., waiting in line for a cashier, scanning items with the cashier, paying for items at the cashier, etc.).

The network(s) 214 may include private networks such as an institutional or personal intranet, public networks such as the Internet, or a combination thereof. The network(s) 214 may utilize wired technologies (e.g., wires, fiber optic cable, and so forth), wireless technologies (e.g., radio frequency, infrared, acoustic, optical, and so forth), or other connection technologies. The network(s) 214 is representative of any type of communication network, including one or more of data networks or voice networks. The network(s) 214 may be implemented using wired infrastructure (e.g., copper cable, fiber optic cable, and so forth), a wireless infrastructure (e.g., cellular, microwave, satellite, etc.), or other connection technologies.

The cart 102 may include communication interface(s) such as devices configured to couple to personal area networks (PANs), wired and wireless local area networks (LANs), wired and wireless wide area networks (WANs), and so forth. For example, the communication interfaces may include devices compatible with Ethernet, Wi-Fi™, and so forth. In some examples, the communication interface(s) may encode the data prior to sending over the network(s) 214 according to the type of protocol or standard being used. As noted above, in some examples, the servers 212 may perform some or all of the operations described below as being performed by the cart 102. While the servers 212 are illustrated as being in a location outside of the facility 200, in other implementations, at least a portion of the servers 122 may be located at the facility 200.

In some instances, the cart 102, the servers 212, and/or a combination thereof may perform the operations of the process 216 during and/or after a shopping session of the user 202. While the following description describes the operation as being performed by the cart 102, it is to be appreciated that these operations may occur at the servers 212 in other implementations.

At an operation 216(1), the cart 102 receives image data generated by one or more cameras, such as one or more cameras mounted to the cart and directed towards a basket of the cart 102. In other instances, the cart 102 may receive the image data from overhead cameras in the facility 200 or the like. Further, in some instances the cart 102 may receive this image data (and/or the cameras may capture the image data) in response to detecting an event, such as an object being placed near the camera(s). For example, the cameras may generate the image data and the cart 102 may receive the image data in response to an item being placed within a predefined proximity of the cameras, such as when a user reaches into a basket of the cart 102 to place an item into the basket or remove an item therefrom. In other instances, meanwhile, the cameras may periodically or continuously generate the image data.

At an operation 216(2), the cart 102 may analyze the generated image data to identify one or more items. In the illustrated example, for instance, the cart 102 analyzes the image data to identify "ABC ketchup" as the item being placed into or removed from the basket of the cart. Of course, while this example shows a single item being identified, it is to be appreciated that the multiple items may be identified in some instances. Furthermore, the cart 102 may identify the item(s) in any number of ways. In one example, the cart 102 analyzes the image data to identify a barcode or other unique visual indicia on the item, while in other instances the cart 102 may generate feature data indicative of visual attributes of the item and may input the feature data into one or more trained models for identifying the item.

Regardless of the method used to identify the item, at an operation 216(3) the cart 102 causes one or more output devices to output an indication that the item(s) have been identified. For example, the cart 102 may cause one or more lighting elements of the cart to illuminate a predefined color, such as green. In addition, or in the alternative, the cart 102 may cause a display on the cart (or any other display, such as a mobile device of a user operating the cart) to present data identifying the item. In some instances, this data may also indicate that the cart is still processing the event to determine a result of the event. For example, and as illustrated, the display may present a spinning icon indicating that the cart 102 is still determining the result of an event involved the identified ketchup.

Furthermore, while this example describes outputting one or more pieces of visual feedback (e.g., in the form of a green light or an update to the display), in some instances the cart may additionally or alternatively output an audible indication that the item has been identified. Furthermore, in instances where the cart 102 is unable to identify an item placed into or removed from the cart 102, the cart 102 may output a different form of feedback indicating the failure to identify the item. For example, the cart 102 may cause the lighting element to illuminate a different color (e.g., orange or red) or according to a different lighting sequence, may cause the display to present an identification-failure indication, may output an audible alert, and/or the like. In some instances, the cart 102 may present data on the display and/or audible data via one or more speakers of the cart 102 instructing the user to again place the item into the cart and/or remove the item from the cart to enable the cart 102 another opportunity to generate new image data and identify the item.

At an operation 216(4), and after identifying the item, the cart 102 may receive weight data generated by one or more weight sensors of the cart 102. As illustrated, the weight sensors may maintain a continuous or periodic weight reading of a basket of the cart 102, which the cart may use to determine the outcomes of events involving the placing items into or removing items from the cart 102.

At an operation 216(5), the cart 102 determines an event associated with the identified item(s) based at least in part on the determined weight data. For example, the cart 102 may input, to an event-determination component 218, information such as the weight-change data, the identifier of the item, the current contents of the virtual cart of the user, and/or the like. The event-determination component 218 may then determine a most-likely outcome of the event(s) involving the identified items. In this example, for instance, the event-determination component 218 may determine that the most likely outcome based on the inputted data is that the user 202 placed two (2) bottles of the identified ABC ketchup into the basket of the cart. As such, at an operation 216(6), the cart 102 updates virtual-shopping cart data 220 associated with the user to indicate the addition of the two jars of ketchup. Furthermore, in some instances, additional data may be used to determine an outcome of an event. For example, the image data may be analyzed to determine a motion vector indicating a direction of the item(s) as they are placed into or removed from the basket, which may be used to determine an action taken with respect to the item(s). Further, the image data may be analyzed to determine a quantity of each item placed into or removed from the basket. In still other instances, sensor data from one or more other sensors may be used to determine event outcomes.

It is further noted that, in some instances, the event-determination component 218 may refrain from attempting to determine the outcome of an event until a weight of the basket, as reported by one or more weight sensors of the cart has stabilized and/or until activity within the basket has ceased. For example, the event-determination component may wait until a current weight of the basket has not changed by more than a threshold amount for more than a predefined amount of time. In addition, or in the alternative, the event-determination component may wait to determine the outcome of an event until the event-determination component 218 receives an indication that activity has ceased within the basket of the cart. For example, an activity-detection component may analyze the image data generated by the one or more cameras and may output an indication when activity has ceased. By awaiting this indication, the event-determination component 218 does not attempt to determine an outcome of an event until the event is likely to have been completed. To provide an example, envision that a user places an item into the basket (resulting in a weight change), before immediately removing the item. By waiting until the image data indicates that no activity is occurring in the basket (that is, until the user has removed his or her hand from the basket), the event-determination component 218 does not first compute an event of an item being placed into a cart followed by an event of the same item being removed from the cart. Instead, by waiting until all activity in the basket has ceased, the event-determination component 218 does not compute an event, given that the item initially placed into the basket was removed.

In one example, the event-determination component 218 may determine the outcome of events by generating respective scores for different possible outcomes of a given series of events. To provide an example, the event-determination component 218 may receive an indication of one or more items identified since the last update to the virtual shopping cart data 220 and the change in weight of the basket of the cart since the last update. In addition, the event-determination component 218 may receive, or may determine, a weight associated with each of the identified items. For example, the event-determination component 218, or another component, may access catalog data using an identifier of each of the identified items to determine a catalog weight associated with each respective item. With this information, the event-determination component 218 may generate one or more hypotheses of how to explain the change in weight of the basket given the identified items (and their catalog weights). In some instances, each hypothesis may indicate an action take with respect to an identified item (e.g., take or return) and a count of each respective item (e.g., zero, one, two, etc.).

In some instances, the event-determination component 218 may determine that a determined hypothesis is associated with a confidence score that is greater than a threshold score and, thus, the virtual shopping cart data 220 may be updated according to this hypothesis. In other instances, the event-determination component 218 might not determine a hypothesis that is greater than the threshold score and, thus, an alarm (e.g., visual, audible, etc.) or other feedback may be output to the user. For example, a lighting element of the cart may be illuminated orange, red, or the like, a display on the cart may indicate that no outcome was determined, or the like. In still other instances, the event-determination component 218 may determine multiple hypotheses that are associated with respective confidence scores that are each greater than the threshold value. In these instances, the cart may output a request to the user for assistance. For example, the cart may output on a display or other output device a request to indicate which of the determined hypotheses corresponds to the actual event performed by the user. Upon receiving input from the user, the cart may update the virtual shopping cart data 220 accordingly.

In some instances, the event-determination component 218 generates the hypotheses and assigns them respective scores using a breadth-first search (BFS) or any other known algorithm. In other examples, the event-determination component may generate a combination of each possible count, bounded by a particular integer of counts (e.g., each possible combination of counts between +n (a number of n instances of the item added to the cart) and −n (a number of n instances of the item removed from the cart)). Further, given that noise may exist in the measurement of the weight of the basket, the event-determination component 218 may be configured to compute a score associated with each respective hypothesis using a probabilistic approach, such:

$$\text{Score (counts, delta)} = Pr(\text{counts} \mid \text{delta}) = Pr(\text{delta} \mid \text{counts}) * \frac{Pr(\text{counts})}{Pr(\text{delta})}$$

In this example, the event-determination component 218 may be configured to assume that Pr(delta) is uniform and, thus, does not change the relative probabilities of one hypothesis over another. Further, given the above, the event-determination component may be configured to compute Pr (delta|counts) (e.g., the probability that the weight of the basket has changed (delta) given the outcome implied by the counts) and Pr(counts) (e.g., the probability that the user performed the outcome implied by the counts).

In some instances, this latter probability (Pr(counts)) may be item-specified, user-specific, facility-specific, and/or the like. For instance, some items may be consistently purchased according to a certain count, such as singularly, in pairs, or the like. For example, historical shopping data may indicate that a first item, such as laundry detergent, is typically purchased one at a time and, thus, the likelihood of a count of +1 (addition of one instance of laundry detergent) may be greater than a likelihood of a count of +2 (addition of two instances). In another example, historical shopping data may indicate that a second item, such as a can of tuna, is typically purchased in multiple quantities. Thus, the likelihood of a count of +1 (addition of one instance of an identified can of tuna) may be less than a likelihood of a count of +2 (addition of two instances).

In addition, or in the alternative, this probability may be user-specific and/or facility-specific. For example, the event-determination component 218 may determine a probability of particular counts based on prior behavior of a particular user operating the cart. For example, if a user associated with a particular cart consistently places three instances of bread into her cart, then this particular count may be associated with a relatively high probability or likelihood. Further, if users at a particular facility often place two instances of chips into their carts, this probability may be relatively high. Further, in some instances a probability of a particular count of an item may be based on additional factors, such as current contents of the cart of the user, time of day, day of week, or the like. For example, if a user is determined to have added two packs of hot dogs to her cart, and hot-dog buns are later identified, the probability associated with the addition of two packages of hot-dog buns may be greater than the probability associated with the addition of one package.

To provide one example of Pr (counts), the event-determination could determine a probability that a user added or removed a number of counts of an identified item between zero (0) and three (3). For example, the event-determination component 218 may be configured to determine with probabilities that a user removed three instances of the same item, added three instances of the same item, and each possibility therebetween. As described above, these probabilities may be generic (e.g., the same for each user, item, facility, etc.) or may be user-specific, item-specific, facility-specific, and/or the like. Further, while the following example describes probabilities for adding or removing three instances of a particular item, any other number of instances may be computed in other examples. In one example, the event-determination component 218 may be configured according to the following probabilities:

$Pr(\text{counts[item]}=+1=60\%$ $Pr(\text{counts[item]}=-1=25\%$ $Pr(\text{counts[item]}=0=10\%$ $Pr(\text{counts[item]}=+2=3\%$ $Pr(\text{counts[item]}=-2=1\%$ $Pr(\text{counts[item]}=+3=0.8\%$ $Pr(\text{counts[item]}=-3=0.2\%$ In the above example, the event-determination component 218 is configured with a 60% probability that a user added a single instance of an item to her cart, a 25% probability that the user removed a single instance of the item from her cart, a 10% chance that the user made no change with regards to the item (e.g., placed the item into the cart before removing it), a 3% probability that the user added two instances of the item to her cart, a 1% probability that the user removed two instances of the item from her cart, a 0.8% probability that the user added three instances of the item to her cart, and a 0.2% probability that the user removed three instances of the item from her cart.

With regards to Pr(delta|counts), if each measurement did not include an error, then the event-determination component 218 may compute a difference between the implied weight change and the actual weight change according to the following:

Implied weight=sum(counts[item]*catalog weight [item])error= absolute value(implied weight−delta)

Here, the Pr(delta|counts) would be 1 if the error is 0 and 0 if the error>0. However, given that the measurements may include error, some tolerance may be introduced such that Pr (delta|counts)=1 if error<tolerance, 0 otherwise.

An example of the above techniques is provided below. It is to be appreciated, however, that this example is one of many and that other algorithms, weights, probabilities, and/ or the like may be used by the event-determination component 218 to determine event outcomes. For sake of brevity and understanding, in the following example, the event-determination component 218 receives an indication that two items have been identified since a last update of virtual shopping cart data of a user (a can of soda and a bag of chips), and the event-determination component determines hypotheses for combinations between the addition of two instances of each item and the remove of two instances of each item. Stated otherwise, while this example describes analyzing the possibilities that the user added or removed two or less of each of the two identified items, in other instances the event-determination component 218 may compute more or fewer hypotheses.

In this example, envision that the event-determination component 218 receives an indication that a can of soda has been identified along with a bag of chips, and that the former item is associated with a catalog weight of 300 g and the latter item is associated with a catalog weight of 100 g. In this example, the event-determination component 218 generates a hypothesis from +2 (two instances added to a cart) to −2 (two instances removed from the cart) for each item. Furthermore, envision that the weight sensors determine that the weight of the basket of the cart has increased by 110 grams between a current time and a time associated with a last update the virtual shopping cart data 220 and that a tolerance of 20 g is applied. Assume further that the virtual shopping cart data 220 indicates that the cart already include one instance of the can of soda and one instance of the bag of chips. Further, the Pr(counts) may be similar to that discussed above, although for a range of +2 to −2 counts.

In this example, the event-determination component 218 may calculate twenty-five (25) hypotheses regarding the two identified items, as bounded between +2 and −2, as follows, where the first value corresponds to the can of soda and the second value to the bag of chips. Further, it is to be appreciated that the event-determination component 218 may zero out probabilities that do not make sense given the current state of the virtual shopping cart data.

[1] −2, −2=>0.000
[2] −2, −1=>0.000
[3] −2, 0=>0.000
[4] −2, 1=>0.000
[5] −2, 2=>0.000
[6] −1, −2=>0.000
[7] −1, −1=>0.000
[8] −1, 0=>0.000
[9] −1, 1=>0.000
[10] −1, 2=>0.000
[11] 0, −2=>0.000
[12] 0, −1=>0.000
[13] 0, 0=>0.000
[14] 0, 1=>0.060**
[15] 0, 2=>0.000
[16] 1, −2=>0.006**
[17] 1, −1=>0.000
[18] 1, 0=>0.000
[19] 1, 1=>0.000
[20] 1, 2=>0.000
[21] 2, −2=>0.000
[22] 2, −1=>0.000
[23] 2, 0=>0.000
[24] 2, 1=>0.000
[25] 2, 2=>0.000

As shown above, the event-determination component 218 has computed two non-zero scores: a first score of 0.06 for the outcome where the user did not add or remove any instances of the can of the soda from the cart but placed one instance of the bag of chips into the cart and a second score of 0.006 for the outcome where the user added one instance of the can of soda into the cart and removed two instances of the bag of chips. However, given that the first outcome has a score that is ten times greater than the latter, the event-determination component 218 may output an indication that this was the result of the event, causing the virtual shopping cart data 220 to be updated to indicate an addition of one bag of chips.

Figure 3A:
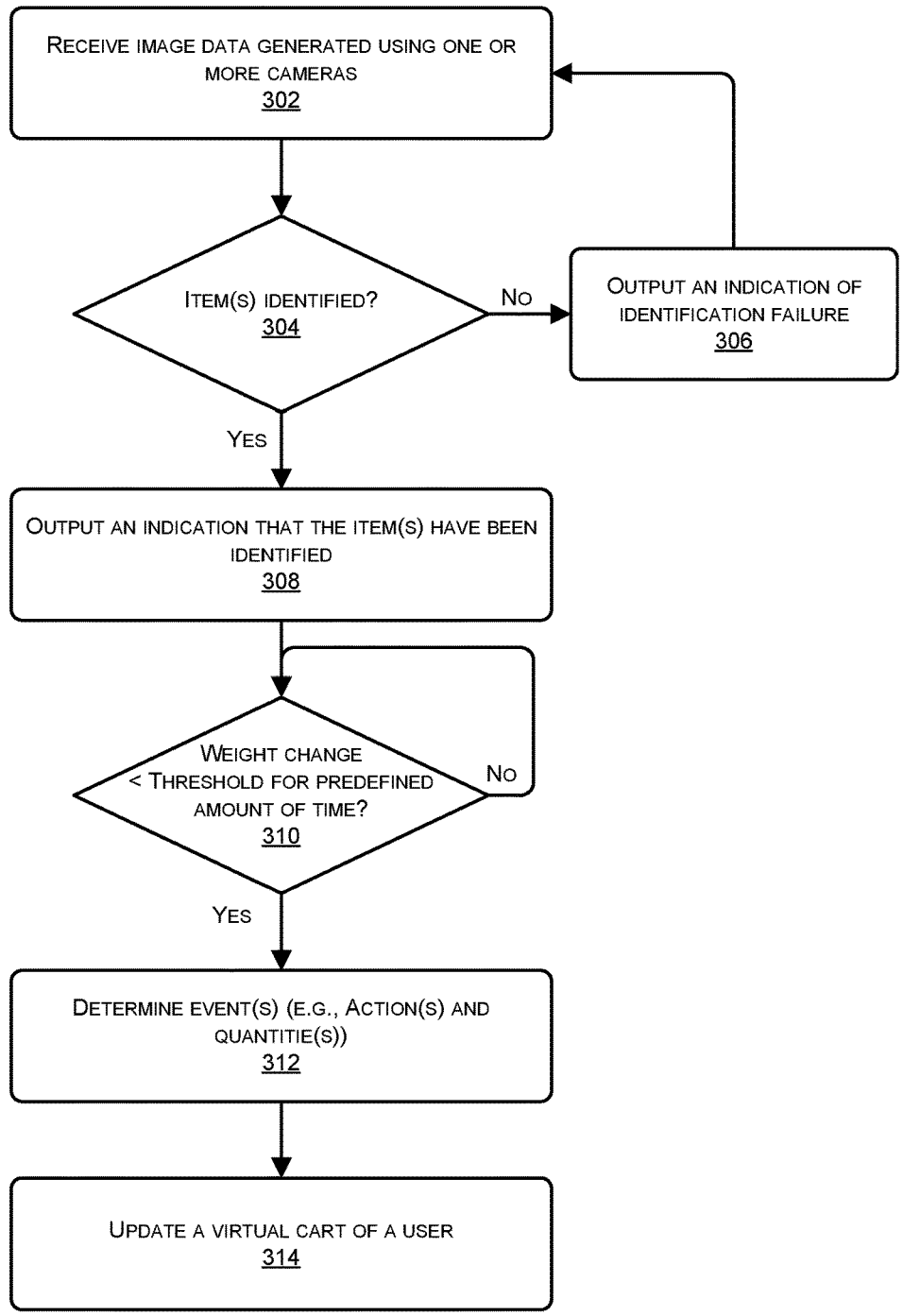
FIG. 3A illustrates a flow diagram of an example process for identifying one or more items, providing an indication that the item(s) have been identified, determining a change in weight of a basket holding the item(s), and determining a result of one or more events involving the identified item(s).

For example, envision that the event-determination component 218 receives an indication that two items have been identified (item A and item B). The event-determination component may list each possible combination of outcomes bounded by the addition or removal of two instances of each item. That is, the event-determination component 218 may determine a likelihood that the outcome of the event was one of the following: removal FIG. 3A illustrates a flow diagram of an example process 300(1) for identifying one or more items, providing an indication that the item(s) have been identified, determining a change in weight of a basket holding the item(s), and determining a result of one or more events involving the identified item(s). The process 300(1), as well as each process described herein, may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation. Finally, while the processes are described as being performed by an item-identifying cart 102, one or more of the operations of these processes may be performed by the remote servers 212, other components, or combinations thereof.

At an operation 302, the event-determination component 218 may receive image data generated by one or more cameras. In some instances, the image data represents one or more items being placed into or removed from a basket of a cart. As described above, these cameras may couple to a frame of the cart, may comprise overhead cameras coupled to a ceiling in an environment of the cart, of the like.

At an operation 304, the image data is analyzed to identify one or more items represented in the image data. As described above, the cart 102 may perform one or more image-recognition techniques to identify the items, including identifying barcodes or other unique visual indicia from the image data. If the cart 102 is unable to identify an item from the image data at 304, then at an operation 306 the cart 102 may output an indication of an identification failure. For example, the cart 102 may cause a lighting element of the cart to illuminate in a predefined color (e.g., orange or red) or according to a predefined lighting sequence, may output an audible alert, and/or may present data on a display of the cart indicating the failure. In one example, the cart 102 may present, on the display, an indication that the cart 102 has failed to identify the item and instructions instructing the user to again place the item in the purview of the camera(s). The process 300(1) may then return to the operation 302.

If, however, the cart 102 identifies the item at the operation 304, then at an operation 308 the cart 102 may output an indication that the item(s) have been identified. For example, the cart 102 may cause the lighting element to illuminate according to a predefined color (e.g., green), may output an audible sound, and/or may cause the display to output an indication. For example, the cart 102 may cause the display to present data identifying the item, such as a picture of the item from an item catalog, a textual representation of the item, or the like.

At an operation 310, the cart 102 may analyze weight data generated by one or more weight sensors on the cart 102 to determinate whether a change in weight of the basket for a predefined amount of time is less than a threshold amount. Stated otherwise, the cart 102 may determine whether the current weight has stabilized to a degree such that the cart 102 may use the weight to attempt to determine the outcome of the event involving the identified item(s) with accuracy. In some instance, jitter introduced to the weight reading from a user moving the cart 102 may cause the current weight reading to fail the test of operation 310. As such, the weight change may stabilize, in some instances, upon the user ceasing movement of the cart 102, but not before.

Upon the weight stabilizing and, thus, meeting the criteria of the operation 310, the cart 102 may attempt to determine the outcome of the event(s) involving the identified item(s). For example, the event-determination component 218 may receive the weight data indicative of a change in weight corresponding to a difference between the current, stabilized weight of the basket and a previous weight of the basket prior to the identification of the item at the operation 304. In some instance, the weight change may be calculated based on a difference between the current weight and a weight of the basket at a time of a previous update to the virtual cart of the user.

Furthermore, in some instances the event-determination component 218 determines the outcome of the event(s) according to the techniques described above. For example, the event-determination component may generate respective probabilities that certain outcomes occurred. If, for example, a particular item was identified, the event-determination component 218 may determine a catalog weight associated with this identified item and may use this catalog weight, the change in weight of the basket, and potentially other information (e.g., current contents of the cart, probabilities associated with different actions, etc.) to determine respective probabilities of different outcomes. For example, the event-determination component may determine a first probability that the user added an instance of the identified item to the cart, a second probability that the user removed an instance of the identified item from the cart, and the like. Further, the event-determination component 218 may determine a first probability that a first quantity of the item (e.g., one instance of the item) was added to the cart, a second probability that a second quantity of the item (e.g., two instances of the item) was added to the cart, a third probability that the first quantity of the item was added to the cart, a fourth probability that the second quantity of the item was removed from the cart, and so forth. The determination of the event(s) at the operation 312 may be based at least in part on these probabilities. For example, an outcome associated with a highest score or probability may be determined to have occurred.

Finally, at an operation 314 the cart 102 may update a virtual cart of the user 202. This may include updating the display of the cart to indicate the addition or removal of the items according to the outcome of the event determined at the operation 312.

Figure 3B:
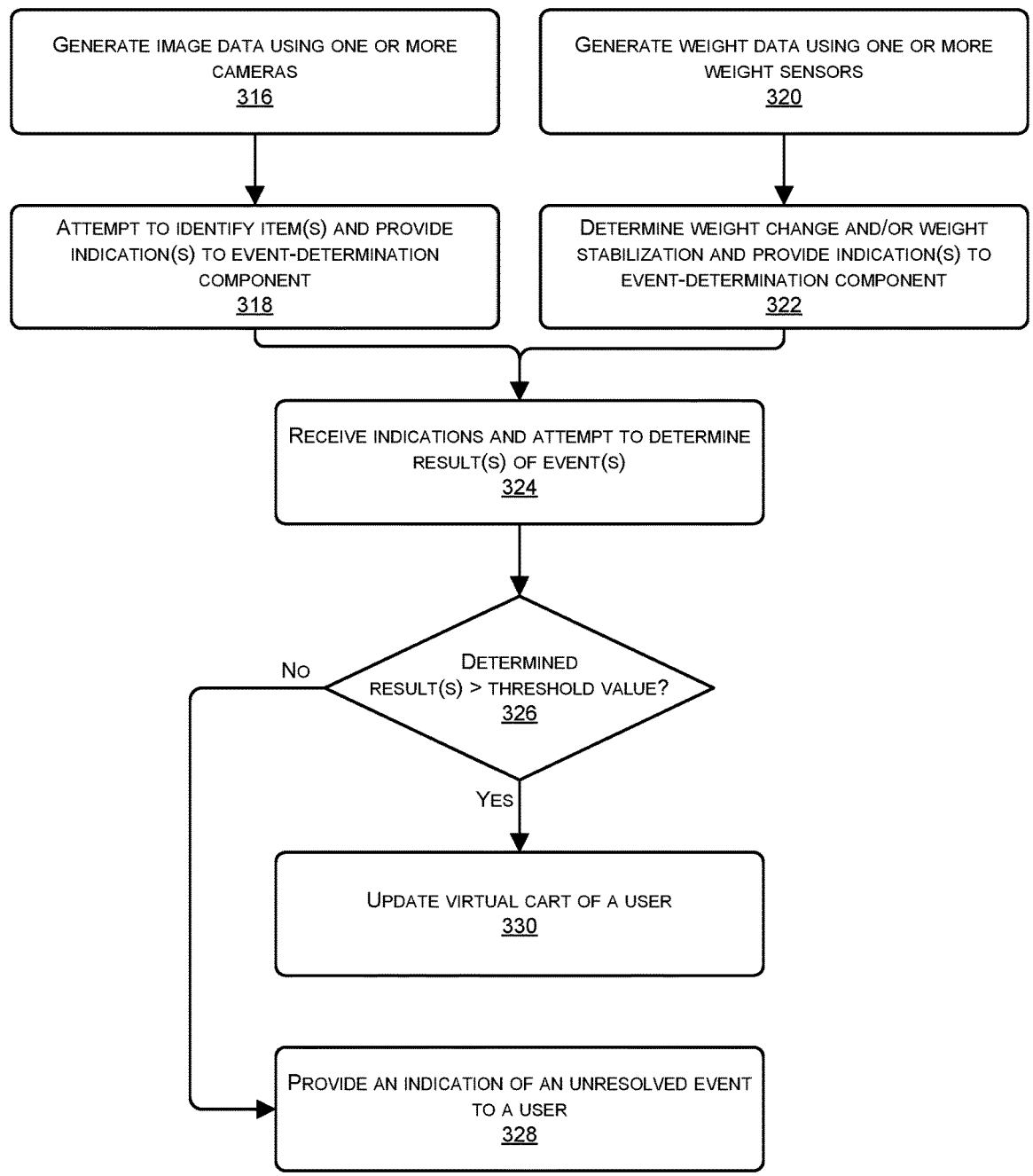
FIG. 3B illustrates a flow diagram of another example process for determining a result of an event using image data and weight data of a basket of a mobile cart.

FIG. 3B illustrates a flow diagram of another example process 300(2) for determining a result of an event using image data and weight data of a basket of a mobile cart. At an operation 316, one or more cameras of a mobile cart may generate image data, which may represent one or more items being placed into or removed from the cart. At an operation 318, an item-identification component (such as component 838 discussed below with reference to FIG. 8A) may analyze the image data to attempt to identify one or more items. As described above and below, the item-identification component may identify a respective barcode of an item to identify the item, may generate feature data from the image data and input the feature data into one or more trained classifiers for identifying the item, and/or the like.

In addition, at an operation 320, one or more weight sensors of the cart may generate weight data indicating a weight of a basket of the cart. At an operation 322, a change in weight of the basket may be determined after the weight has stabilized, and an indication of the weight change may be provided to the event-determination component 218.

At an operation 324, the event-determination component 218 receives indication(s) of any identified item(s) from the image data and an indication of a weight change in the basket of the cart and attempts to determine the results of one or more events based at least in part on this data. For example, and as discussed above, the event-determination component 218 may determine a catalog weight associated with each of the identified items and may generate one or more hypotheses that each may explain the change in weight of the basket. As described above, this may include generating respective probabilities that different quantities of the identified items have been added to and/or removed from the basket of the cart.

At an operation 326, the event-determination component 218 determines whether any of the determined results are greater than a threshold value. If not, then at an operation 328 the event-determination component 218 or another component may output an indication of an unresolved event. That is, if the event-determination component 218 is unable to determine with a threshold amount of confidence the reason for the weight change of the basket, then the cart may output such an indication to the user via an orange light, an indication a display, an audible alert, or the like. If, however, the most likely hypothesis is associated with a confidence score that is greater than a threshold value, then at an operation 330 a virtual cart associated with the user operating the cart may be updated. For example, if the event-determination component determines that one instance of item A has been added to the cart, two instances of item B have been removed from the cart, and three instances of item C have been added to the cart, then the process 300(2) may update the virtual shopping cart data 220 associated with the user operating the cart to indication one addition of item A, three additions of item C, and two removals of item B.

Figure 4A:
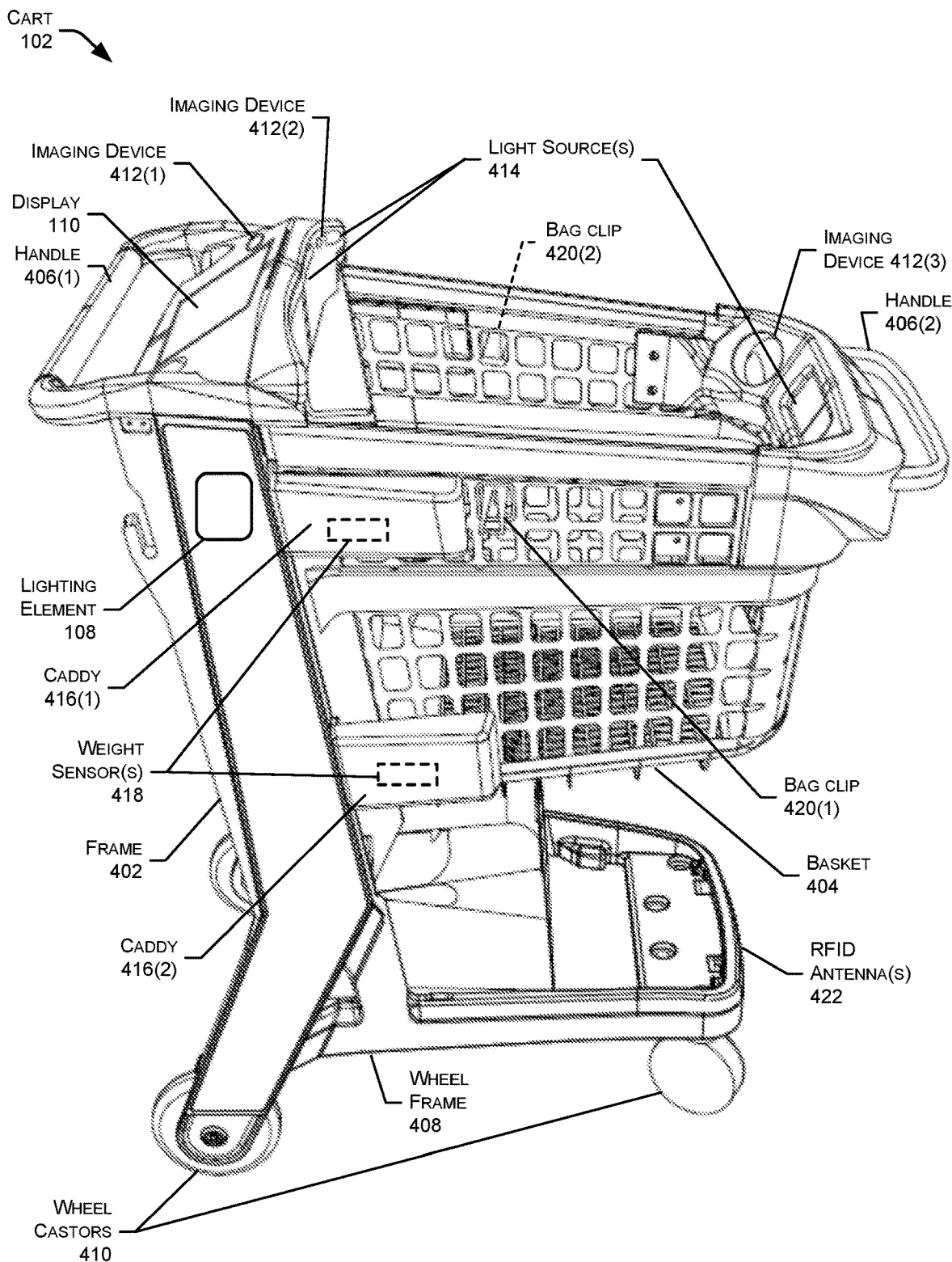
FIG. 4A illustrates a perspective view of an item-identifying cart that may be configured to identify items placed therein (e.g., using image data generated by one or more cameras mounted to the cart) and, thereafter, to determine the outcome of events involving the identified items (e.g., using one or more weight sensors mounted to a frame of the cart).

FIG. 4A illustrates a perspective view of an item-identifying cart 102 that may be configured to identify items placed therein (e.g., using image data generated by one or more cameras mounted to the cart) and, thereafter, to determine the outcome of events involving the identified items (e.g., using one or more weight sensors mounted to a frame of the cart).

As illustrated, the cart 102 may generally include or be formed of a frame 402, a basket 404, a first handle 406(1) for pushing the cart 102, a second handle 406(2) for pulling the cart, a wheel frame 408, and one or more wheel castors 410 to enable movement of the cart 102 on a surface. The frame 402, the basket 404, the handles 406, and the wheel frame 408 may be formed from any suitable materials such as plastics, wood, metals, composites or any other combinations of materials. Moreover, frame 402, the basket 404, the handle 406, and the wheel frame 408 may take any form.

The basket 404 may generally be part of the frame 402 and/or supported by the frame 402 (e.g., be welded, fused, adhered, bolted, screwed, molded, or otherwise joined to the frame 402). In some examples, the basket 404 may comprise a grid or lattice-like structure (e.g., a honeycombed arrangement or framework) having one or more bars or members that are welded, fused, adhered, bolted, screwed, molded, stitched or otherwise joined in a substantially perpendicular alignment with respect to one another. The basket 404 may generally be any shape that defines an interior cavity, or receptacle, for receiving items 104 that are placed in the cart 102. The basket 404 may comprise a bottom, multiple sides protruding from the bottom, and a top. As illustrated, the bottom basket 404 may be in the shape of a quadrilateral such that there are four sides protruding from the bottom of the basket 404. Similarly, the top of the basket 404 may be defined according to the quadrilateral shape and have a perimeter with four corners. The perimeter of the top of the basket 404 may define an opening to the interior cavity (or receptacle) of the basket 404 to receive items placed inside the basket 404. In various examples, the perimeter of the top of the basket may be disposed in a substantially horizontal plane (e.g., a plane substantially along the x-axis as illustrated), and the frame 402 may include at least one vertical member that extends downward from the basket 404 to the wheel frame 408 along a substantially vertical plane (e.g., a plane substantially along the y-axis as illustrated).

The wheel frame 408 may support one or more wheel castors 410 to enable movement of the cart 102 along a surface. The wheel castors 410 include one or more wheels, axles, forks, joints or other components which enable the cart 102 to travel on various surfaces. For example, in some implementations each of the wheel castors 410 may include a single wheel provided on an axle within a fork, or two or more wheels provided on such an axle. In some other implementations, the wheel castors 410 may include two or more axles. Alternatively, in still other implementations, a single caster may be provided in lieu of the multiple wheel castors 410. In accordance with the present disclosure, the wheel castors 410 may operate in any manner, such as being configured to pivot or swivel, and thus automatically adjust or align with a direction of travel. In some examples, the cart 102 may be equipped with other apparatuses for enabling the cart 102 to travel on solid surfaces, including one or more wheeled components other than casters, including but not limited to omnidirectional wheels, spherical wheels or other like apparatuses. Additionally, in some other implementations, the cart 102 may include two or more skis or other runners for traveling on smooth surfaces. In still other implementations, the cart 102 may be levitated, e.g., by magnetic levitation through the use of one or more linear induction motors. Moreover, the cart 102 may be propelled or pushed by humans or autonomous mobile robots or, alternatively, by one or more motors (e.g., electric-powered or gasoline-powered).

As illustrated, the cart 102 may include a first imaging device 412(1), for identifying a user operating the cart as described above, and additional, second imaging devices 412(2), 412(3), 412(4) . . . , 412(N) that include components for use in identifying items placed in the basket 404 and removed from the basket 404. The imaging device 412(1) may, in some instances, be positioned in a manner such that an FOV of the imaging device 412(1) is away from the basket 404 and substantially towards the first handle 406(1) where a user may typically operate the cart 102. The imaging devices 412(2)-(N) may be positioned at any location on the cart 102 (e.g., in the basket 404, on the basket 404, mounted to the frame 402, mounted to the basket 404, and/or any other location), oriented to have respective FOVs for identifying events that occur within and proximate to the basket 404. In some examples, the cart 102 may include at least four of the second imaging devices 412(1), 412(2), 412(3), and 412(N) that are disposed or coupled proximate to four corners of the top of the basket 404. In some examples, one or all of the components of the second imaging devices may be disposed internal to the form factor of the basket 404 and/or frame 402, at least partially internal to the form factor of the basket 404 and/or frame 402, and/or entirely external to the form factor of the basket 404 and/or frame 402 (e.g., mounted to the cart 102). However, in the illustrated example, the second imaging devices may be disposed at locations proximate to the four corners of the top or perimeter of the basket 404/frame 402. In some instances, the less that the second imaging devices protrude from the form factor of the cart 102, the more efficiently the carts 102 may be nested with respect to each other.

As described in further detail below with respect to FIG. 4B, the cart 102 may further include one or more one light sources (e.g., LEDs) for emitting light at or prior to the time of the second imaging devices generating the second image data. The cart 102 may further include, in some instances, one or more proximity sensors (e.g., ToF sensor, PIR sensor, etc.). In some examples the proximity sensors may be activated to detect the proximity of items 104 or other objects above the top of the basket 404. The proximity sensors may be configured to generate sensor data that indicates distances between objects above the top of the basket 404 of the cart 102 and the second imaging devices. The cart 102 may include components configured to analyze the sensor data and determine that an item 104 is within some threshold distance from the top of the basket 404 and/or within the basket 404. Upon detecting an object within the threshold proximity of the basket 404 using the proximity sensor, one or more components of the cart 102 may cause the light sources (LEDs) to emit light and the second imaging devices to generate image data. In some examples, the FOVs of the second imaging devices 412(2)-(N) may each at least partially overlap at a location above the top of the basket 404 corresponding to a centroid of the quadrilateral defining the top of the basket 404. The light sources may illuminate the basket 404 and/or the area above the top of the basket 404 to illuminate items 104 being placed in the cart 102, or removed from the cart 102, to act as a "flash" for the cameras that are generating image data. The second imaging devices may generate image data for a predefined period of time and/or until the proximity sensors (or the image data itself) indicates that there is no longer an object within the threshold distance from the cart 102 or top of the cart 102.

After generating the image data, one or more components of the cart 102 may process the image data to determine an item identifier for the item(s) 106 represented in the image data, and an event 106 for the image data (e.g., addition of an item 104 to the cart, removal of an item 104 from the cart). In some instances, the cart 102 may include component(s) to determine an item 104 identifier for the item 104 (e.g., name of the item 104, SKU number for the item 104, etc.), and determine if the item 104 is being taken from the cart 102, or added to the cart 102, based on the motion of the item 104 and the result of the movement around the cart 102 once movement is no longer detected and represented by the image data. In other instances, the image data may be analyzed to identify the item, while the weight data may be analyzed as described above and below for determining the event associated with the item.

In either of these instances, the components of the cart 102 may then update a virtual shopping cart associated with the cart 102 that indicates a virtual listing of items 104 taken by the user 202 from the facility based on the determined event 106. In some examples, the image data may be transmitted to the server(s) 212 over the network(s) 214 where the processing may be performed.

In various examples, the cart 102 may include a display 110 to present various information in user interface(s) for the user 202 to consume. In some examples, the display 110 may comprise a touch screen to receive input from the user 202 (e.g., a selection of an item identifier to disambiguate amongst potential item identifiers). In some instances, the display 110 may present customized information to the user 202 upon identifying the user 202, such as a shopping list of the user or the like. Further, the display 110 may be used to provide feedback to the user when one or more items have been identified and to update a virtual shopping cart of the user when one or more event(s) associated with these items have been determined. The display may also be used to indicate when components of the cart 102 are unable to identify an item or resolve an event associated with an item. In these instances, the display may present a request that a user perform some action, such as input on the display a result of the event, hold the item(s) in front of the imaging devices 412, or the like.

The cart 102 may further include a battery pack module that houses one or more batteries to power the components of the cart 102. The battery pack module may include rechargeable batteries. In some examples, the battery pack module may be detachably coupled to the wheel frame 408 and/or the frame 402 of the cart 102 such that the battery pack module may be removed and taken to a charging station. In various examples, the battery pack module may include rechargeable batteries that may be charged when the cart 102 is placed in a cart corral 208 (e.g., through electrical contacts, power cords, etc.). In various examples, the frame 402 and/or basket 404 may have one or more channels (e.g., grooves, holes, paths, tunnels, etc.) through which power cables/cords may pass. In this way, power cables may be run at least partially through the channels in the frame 402 and/or basket 404 inconspicuously to provide power to the various components of the cart 102.

In some instances, the cart 102 may further include one or more lighting elements 108 disposed on the frame 402 and/or basket 404 of the cart 102. The user 202 may, in some instances, operate a controller to turn on (and off) the lighting element(s) 108 to cause the lighting element(s) to emit light. Further, in some instances the controller may enable the lighting element(s) 108 to transition between multiple light states, such as different colors, flashing effects, and/or the like. The controller operable by the user 202 may comprise functionality accessible to the user 202 via the display (e.g., one or more soft buttons for turning on and/or off the light), a physical toggle switch on the frame 402 of the cart 102, and/or the light. Further, the lighting element(s) 108 may be used to signal a predefined state of the cart 102 and/or the user 202. For example, the user 202 may turn on the lighting element(s) 108 to indicate that he or she requests assistance from an associate of the facility 200, or for any other reason. In some instances, in response to the user 202 operating a controller to request assistance, the cart 102 may perform one or more actions in addition to turning on the lighting element(s) 108. For example, the display may present content responding to this request, such as an offer to connect the user 202 with an associate of the store (e.g., in person, via I/O devices of the cart, etc.). For example, in response to requesting assistance, the cart 102 may facilitate an audio-only or an audio/video call between the user 202 and an associate of the facility using one or more I/O devices on the cart, such as the display, one or more speakers, one or more microphones, one or more cameras pointed toward the user 202 and/or the like.

In still other instances, associates of the facility may, remotely or otherwise, operate the lighting element(s) 108 to change states (e.g., turn on or off) and/or the cart 102 may include components to automatically change a state of the lighting element(s) 108. For example, upon the card identifying that an item of a predefined class of items has entered the basket, the cart 102 may cause the lighting element(s) 108 to change state (e.g., from an off state to an on state) to indicate that an additional checkout workflow may now be required. For example, if the user 202 places an item into the basket 404 that requires the purchasing user to be of a certain age (e.g., alcohol) or to have a certain prescription (e.g., medicine), the cart 102 may illuminate the lighting element (s). In some instances, the cart 102 may include a lighting element on a right side of the frame, a lighting element on a left side of the frame, and/or one or more other lighting elements in other locations on the cart 102. In still other instances, the lighting element(s) 108 may be illuminated to provide feedback to the user operating the cart. For example, the lighting element may be instructed to illuminate green in response to the cart identifying an item and orange in response to the cart failing to identify an item or resolve an event associated with an identified item.

FIG. 4A further illustrates that the cart may include the first imaging device 412(1) for identifying a user, the one or more second imaging devices 412(2)-(N) for identifying items placed into or removed from the basket 404, the display 110 for presenting information to a user operating the cart 102, and the one or more lighting elements 108. In addition, the cart 102 may include one or more light sources 414 that function to emit light prior to and/or while the second imaging devices 412(2)-(N) generate the second image data for identifying items placed into and removed from the basket 404. In some instances, these light sources 414 emit constant light, while in other instances the light sources 414 emit light in a strobing manner. In either of these instances, the light may be visible and/or non-visible light.

In addition, the cart may include one or more caddies, such as a caddy 416(1) and a caddy 416(2), coupled to the left and/or right side of the frame or basket of the cart 102. For example, the cart 102 may include the first and second caddies 416(1) and 204(2) on the right side of the cart, and two similarly situated caddies on the left side of the cart (not shown). Each caddy may define a receptacle (e.g., having an opening at the top) for housing one or more items therein. In some instances, the caddies may be beyond the FOV of the second imaging devices 412(2)-(N) such that the user is able to place personal items (e.g., keys, wallet, phone, etc.) into the receptacle defined by the respective caddy without the imaging devices 412(2)-(N) generating image data corresponding to this addition. In other instances, the caddies may be within the FOV of one or more of the imaging devices.

In addition, one or more of the caddies may include one or more respective weight sensors 418 for determining a current weight of the basket 404 and, thus, items in the basket 404. For example, each caddy may comprise a respective weight sensor 418 comprising a strain gauge or other sensor that continuously or periodically may be used to determine a weight of the basket and/or whether a change in weight has occurred. As illustrated, the cart 102 may include two weight sensors 418 on each side of the basket 404. Each pair of weight sensors 418 may, in some instances, reside along the same vertical axis. That is, a top weight sensor on the right side of the basket 404 may reside above a bottom weight sensor on the right side.

This weight data may be used to identify when items have been placed into or removed from the basket and, in some instances, may be used to identify items placed into or removed from the basket. For example, the weight data may be used to determine the identity of an item placed into or removed from the basket (e.g., to identify that a bottle of ketchup was placed into the basket), identify a number of instances of an item (e.g., a number of bottles of ketchup placed into the basket), to measure an amount of something (e.g. 1 pound of peanuts), and/or the like.

FIG. 4A further illustrates that the cart 102 may include one or more bag clips, such as a bag clip 420(1) on a right side of the basket 404 and a bag clip 420(2) on a left side of the basket 404. As illustrated, the bag clips 420 may reside on an outside, top portion of the basket such that a user may place a bag into the interior of the basket while securing a first strap of the bag to the first clip 420(1) and a second strap of the bag to the second clip 420(2). Thereafter, the user may place items into and/or remove items from the bag. At the end of the shopping session, the user may remove the bag containing the items from the basket (e.g., by removing the straps from the clips) and exit the facility.

FIG. 4A further illustrates that the cart 102 may include one or more RFID antenna(s) 422, which may be used for determining a location of the cart 102 within the facility 200. In some instances, the inventory locations 204 may include respective RFID tags that may be read by the RFID antennas 422 of the cart. In some instances, the cart 102, or a remote system communicatively coupled to the cart 102, may store map data that indicates associations between respective location with the facility to respective RFID tags throughout the facility. As illustrated, in some instances the RFID antennas 422 may reside near a bottom portion of the frame of the cart. In other instances, however, the RFID antennas 422 may reside at other locations on the cart 102 and/or distributed at multiple locations on the cart 102.

Figure 4B:
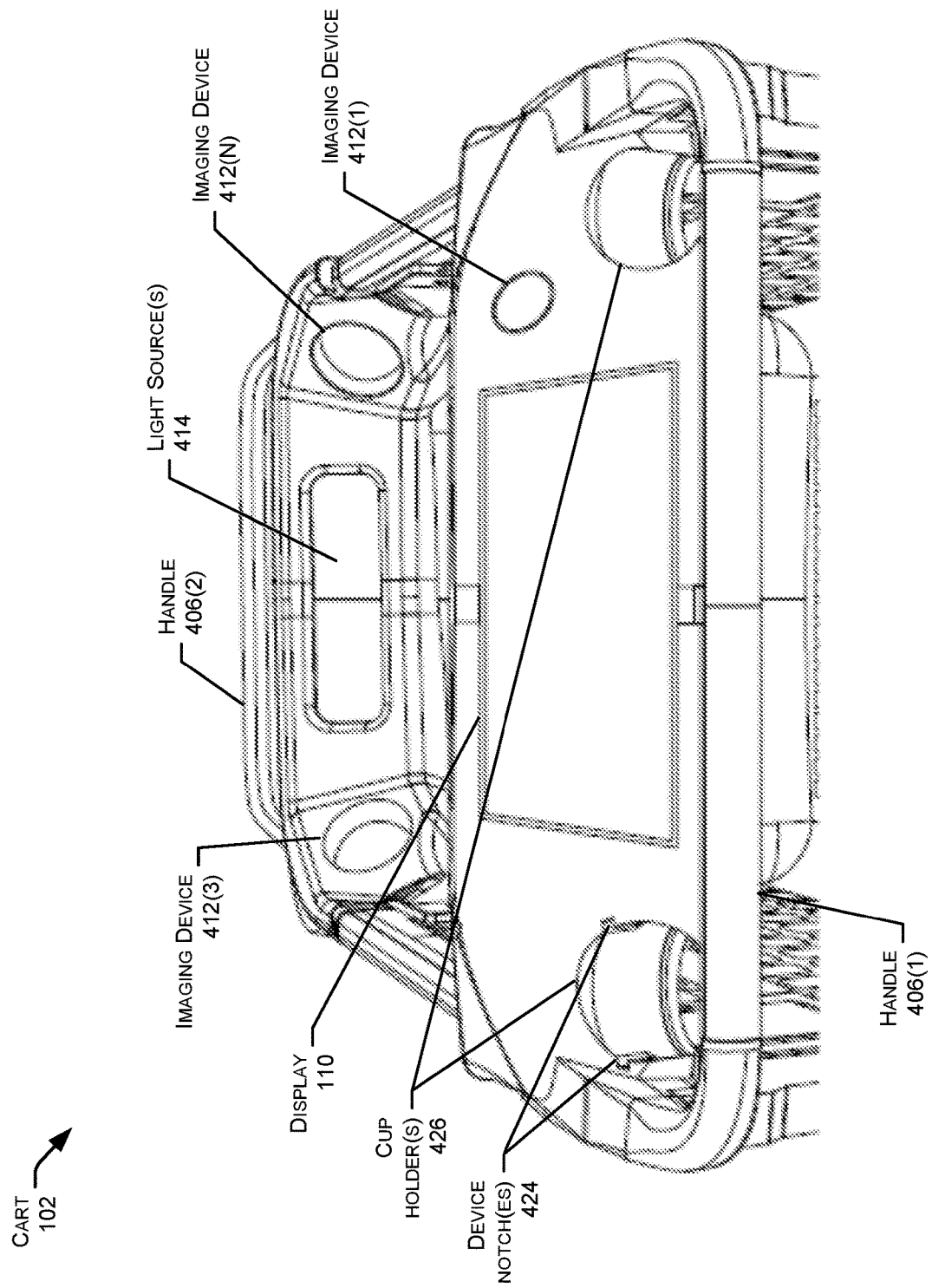
FIG. 4B illustrates a front view of the example item-identifying cart of FIG. 4A. As illustrated, the cart may include a display, which may be used to provide feedback to a user operating the cart.

FIG. 4B illustrates an example front view of the cart 102. As illustrated, the cart includes the first handle 406(1) for pushing the cart 102, the second handle 406(2) for pulling the cart 102, the imaging device 412(1) for generating data for identifying a user operating the cart, the second imaging devices 412(2)-(N), and the display 110 to present content to the user operating the cart. The front view also illustrates that the cart may include the light source(s) 414 between the imaging device 412(3) and 412(N). In some instances, the cart may further include a light source to the left of the imaging device 412(3) and/or a light source to the right of the imaging device 412(N).

In addition, the cart 102 may include one or more cup holders 426 (in this example, on the left and right sides of the display 110) for holding respective cups of the user. In addition, each cup holder may include one or more device notches 424, comprising recesses of the cup holder in which a user may secure a device, such as a mobile phone or the like. That is, the device notches 424 may provide respective slots in which a user may place an electronic device, such as a phone, in a manner in which the device is secure while a display of the device is oriented towards the user operating the cart. Thus, the user, may engage in the shopping session while having a shopping list or the like displayed on a device that sits securely in the device notches 424 of the cup holder 426.

Figure 4C:
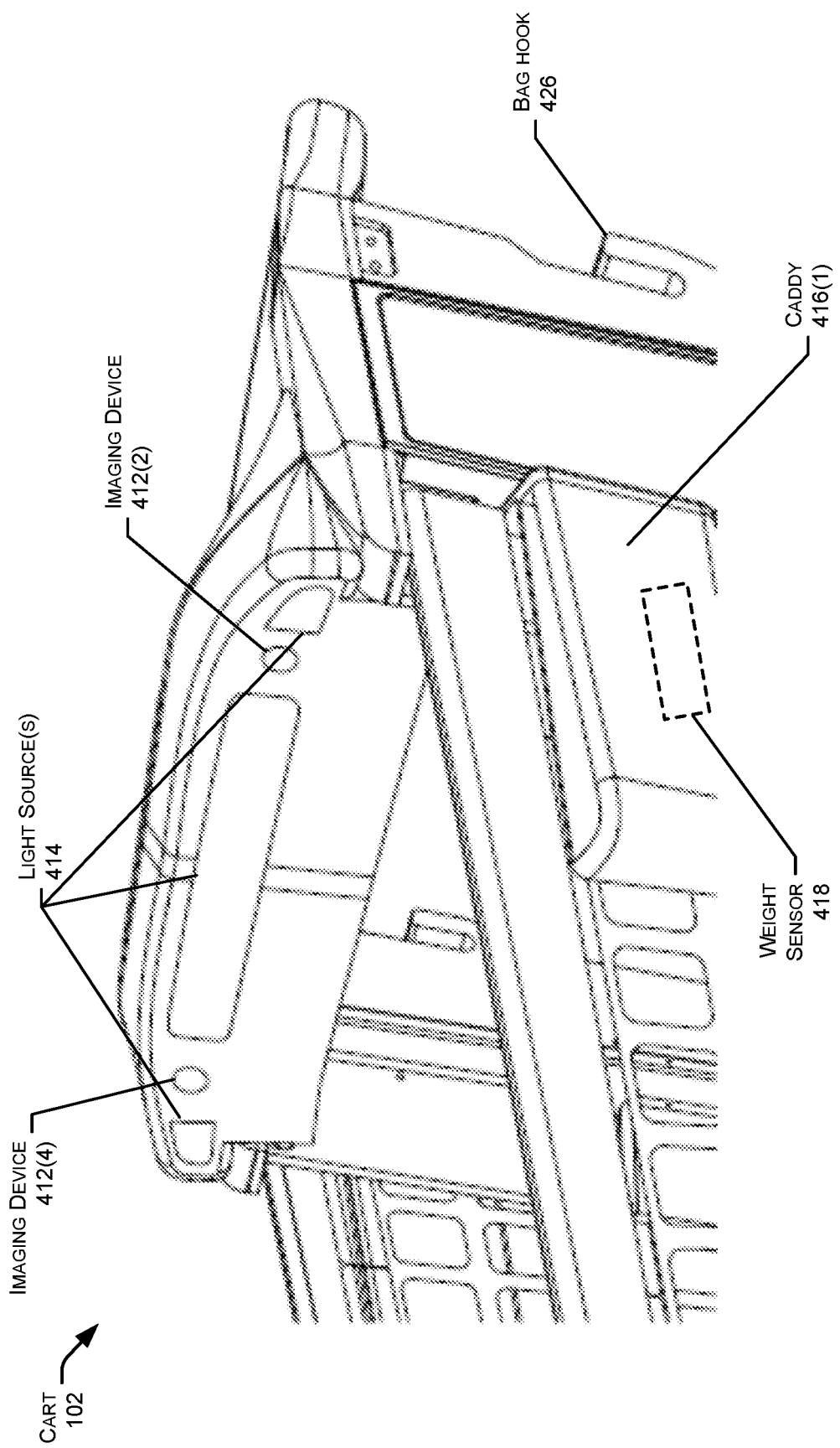
FIG. 4C illustrates yet another view of the example item-identifying cart of FIG. 4A. As illustrated, the cart may include one or more cameras for generating image data for identifying items placed into or removed from a basket of the cart. In addition, the cart may include one or more weight sensors for generating a current weight of the basket, which may be used to determine results of events involving the identified items.

FIG. 4C illustrates a closer view of one or more imaging devices 412(2) and 412(4) having an FOV substantially towards the basket of the cart. This figure also illustrates that the cart 102 may include one or more light sources 414 between the imaging devices 412(2) and 412(4), to the left of the imaging device 412(3), and/or tot the right of the imaging device 412(2). In addition, FIG. 4C illustrates an example caddy 416(1), which may define a receptacle for housing one or more items, as discussed above. Further, one or more weight sensors 418 may reside within or adjacent to the caddy 416(1) for generating weight data indicating a weight or change in weight of the basket. Finally, this figure illustrates that the frame 402 of the cart 102 may include one or more bag hooks 426, comprising hooks in which a user operating the cart 102 may secure one or more bags. In some instances, the cart 102 may include a bag hook on a rear-left side of the frame (e.g., near a user operating the cart) and/or a bag hook on a rear-right side of the frame.

FIG. 5A illustrates an example cross-sectional view of an item-identifying cart 500 that includes imaging device 412 for identifying items 104 placed in the cart 500 and weight sensors for determining outcomes of events involving these identified items. While this cart 500 may have a different form factors than other carts illustrated and described herein, characteristics of the cart 500 may be applied to the other cart form factors, and vice versa. As illustrated, the cross-section of the cart 500 is taken along a plane defined by the x-axis and y-axis along the center of the cart 500 from the back to the front of the cart 500.

In some examples, the imaging device 412(2) is positioned at a first corner of the basket 404 near the back of the cart 500. The imaging device 412(2) may have an optical axis 504 and an FOV 506 oriented along the x-y plane. The optical axis 504 of the imaging device 412 (12 may be directed upward from a substantially horizontal plane 508 and towards the interior of the perimeter 510 of the basket 404. In some examples, the basket 404 may include a bottom of the basket 512, ones or more sides of the basket 514 protruding up from the bottom 512, and a top of the basket (perimeter) 510 that is disposed along the substantially horizontal plane 508. In some examples, the FOV 506 of each of the second imaging devices may have a lower edge that is defined according to the horizontal plane 508.

The first imaging device 412(2) may have an optical axis 504 directed upward from the substantially horizontal plane 508 and towards the interior of the perimeter 510 of the basket 404. In some examples, the FOV ($\theta_{x,y}$) 506 may be defined according to the optical axis 504 (e.g., the optical axis 504 may be approximately the middle of the FOV 506). The FOV 506 may be any FOV for of the second imaging devices (e.g., 80 degrees, 70 degrees, 45 degrees, etc.). Generally, the FOV 506 may at least partially include an area above the top of the basket 210. Similarly, another imaging device 412(4) coupled proximate to a corner of the basket 404 on the front of the cart 500. The imaging device 412(4) may have an optical axis 504 directed upward from the substantially horizontal plane 508 and towards the interior of the perimeter 510 of the basket 404. In some examples, the FOVs 506 may include an area above the top 510 of the cart 500, an area within the basket 404 of the cart, and/or a combination of above and below the top 510 of the basket 404.

FIG. 5B illustrates an example top view of an item-identifying cart 500 that has imaging devices 412(2)-(N) for identifying items 104 placed in the cart 500. As illustrated, the cart 500 is shown from a top such that the dimensions of the cart 500 are illustrated along an x-axis and a z-axis (x-z coordinate plane).

In some examples, four imaging devices 412 are positioned at four different corners of the frame 402 and/or basket 404 of the cart 500. Each of the four imaging devices 412 may include respective optical axes 518 directed inward relative to the perimeter 510 of the basket 404. Additionally, the four imaging devices 412(2)-(N) may each have FOVs ($\theta_{x,z}$) 520 that are defined according to the optical axes 518 (e.g., the optical axes 518 may be approximately the middle of the FOVs 520). The FOVs 520 may be any FOV for cameras in the imaging devices (e.g., 80 degrees, 70 degrees, 45 degrees, etc.). Generally, the FOVs 520 for each of imaging devices 412 may overlap at least partially at a centroid 522 of the frame 402 and/or basket 404 of the cart 500. The FOVs 520 may, in combination, cover all, or most, of the interior of the perimeter 510 of the basket 404 such that items 104 are detected and identified using at least one of the imaging devices 412.

FIG. 5C illustrates an example perspective view of an item-identifying cart 500 that has imaging devices 412 for identifying items 104 placed into the cart 500. As illustrated, the cart 500 may include multiple imaging devices that have viewing frustums 526 that may be oriented in the same direction as the optical axis 504. The viewing frustums 526 may generally be the region of space in the environment of the cart 500 that is within the field of view of the camera and/or proximity sensor of the imaging devices 412. The viewing frustums 526 for each of the imaging devices 412 may be oriented inward to the basket 404 of the cart, and upward relative to the top, or perimeter, of the basket 510. The proximity sensor, if present, and imaging devices may have the same viewing frustum 526, or different viewing frustum's 526 that at least partially overlap.

FIG. 5D illustrates another example perspective view of an item-identifying cart 500 that has imaging devices 412 for identifying items 104 placed into the cart 500. As shown in FIG. 5D, the viewing frustums 526 and/or FOV's 506 for each of the imaging devices 412 may generally define a region of view 530. The region of view 530 may comprise a volumetric, three-dimensional (3D) shape in which items 104 are captured in image data of the cameras, and/or detected by proximity sensors. Thus, the region of view 530 defines a volumetric region in which at least one of the cameras is able to capture image data representing an item 104. Generally, the region of view 530 may encompass substantially all, or a large majority of, the perimeter of the top of the basket 510. In this way, items 104 placed in the basket 404 will be detected and have image data generated that represents the items 104 as they are being placed in the basket 404. Although illustrated as including space above the basket 404, in some examples, the region of view 530 may additionally, or alternatively, include space inside the basket 404 (e.g., downward facing cameras). In some instances, the region of view 530 defined by the cameras on the cart 102 may be the same as the region of view 530 of the proximity sensors, or different than the region of view 530 of the proximity sensors.

Figure 6:
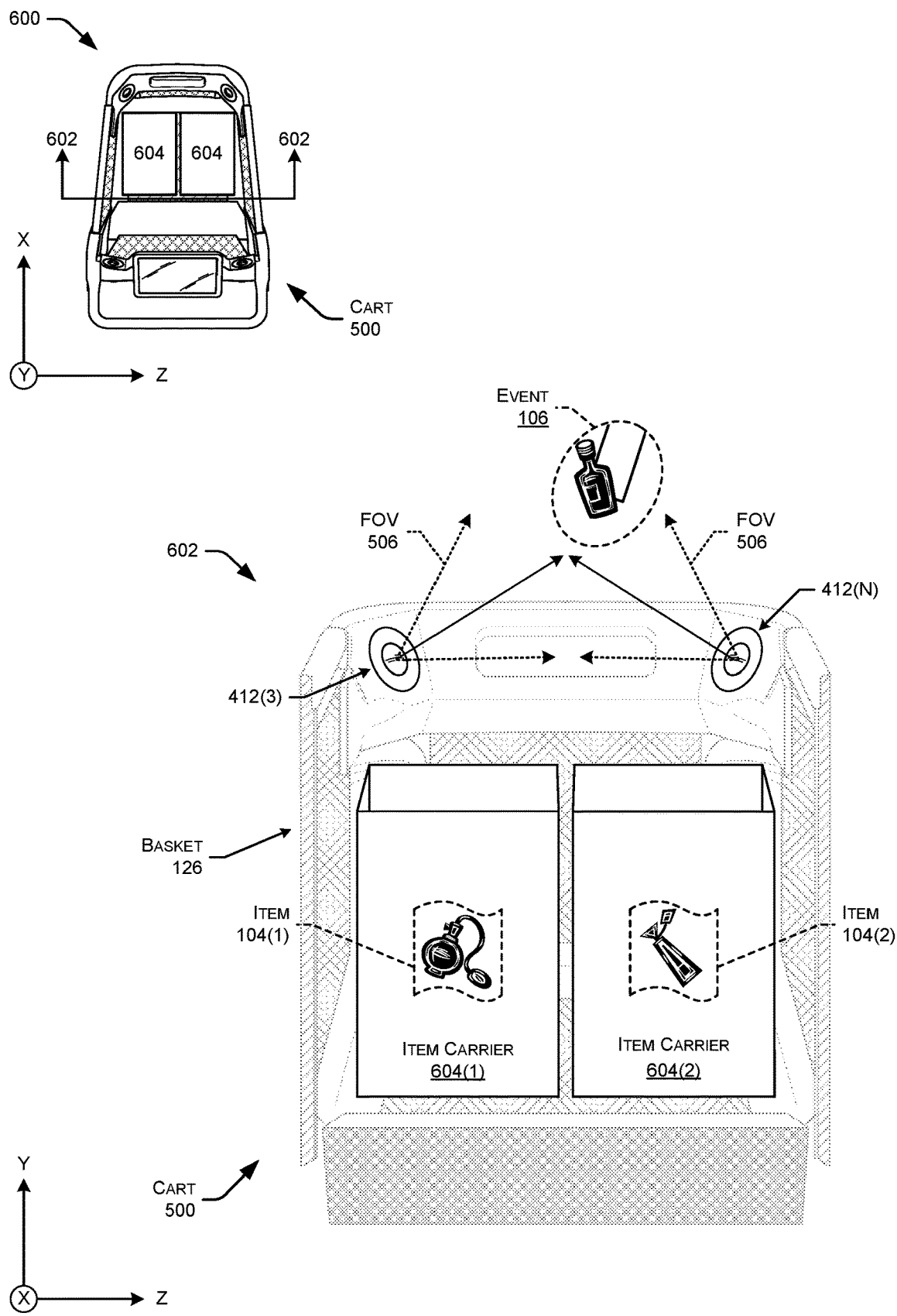
FIG. 6 illustrates another example cross-sectional view of an item-identifying cart that has item carriers placed inside the basket of the cart, and cameras that are used to identify an item being placed in the item carriers.

FIG. 6 illustrates another example of an item-identifying cart 500, including a top view 600 and a cross sectional view 602, that has item carriers 604 placed inside the basket of the cart 500, and imaging devices 412 and light sources 414 that are used to identify an item being placed in the item carriers 604.

As illustrated by the top view 600, the cart 500 may include a basket that is sized to store one or more item carriers 604, such as bags (e.g., plastic bags, paper bags, etc.), boxes, user-provided item carrier, and/or any other item carrier 604. In some examples, the cart 500 may have a basket 404 that is sized to efficiently fit (e.g., minimize empty space in the basket 404) one or more of the item carriers 604. As shown in the cross-sectional view 602 of the basket 404 of the cart, the item carriers 604 may be sized such that the tops of the item carriers 604(1) and 604(2) are below the perimeter defining the top of the basket 404. In this way, the FOVs of the imaging devices 412 are not obstructed by the item carriers 604.

As shown, the item carriers 604 may have items 104 stored therein, which are no longer visible to cameras due to their placement in the item carriers 604. Accordingly, if the imaging devices 412 had FOVs 506 that generated image data of the interior of the basket 404, the items 104 may not be visible due to occlusion from the item carriers 604. However, to identify the items 104 placed in a cart 500, the imaging devices 412 need to be able to view the items 104, which would prevent users 202 from being able to place item carriers 604 in their carts 102. Thus, by having FOVs 506 that at least partly face upward relative to the top of the perimeter of the basket 404, the items 104 that are placed in the basket are identifiable in image data generated by the imaging devices 412. Additionally, users 202 are able to place their item carriers 604 directly in the basket 404 to receive items 104 as the user 202 shops, thereby reducing friction in the traditional-checkout experience by having to take items out of the cart 500 to be bagged or otherwise placed in item carriers 604.

In some examples, the basket 404 (or other location on the cart 500) may include one or more hooks to help support the item carriers 604. For instance, the item carriers 604 may be a cloth, or other material, with handles or holes. To help hold the item carriers 604 open and/or up, the basket 404 may include hooks near the top or perimeter and/or hooks on the outside of the basket 404 to hook into holes of the item carriers 604 and/or to hold up handles of the item carriers 604, such as the bag clips 420(1)-(2) discussed above.

Figure 7:
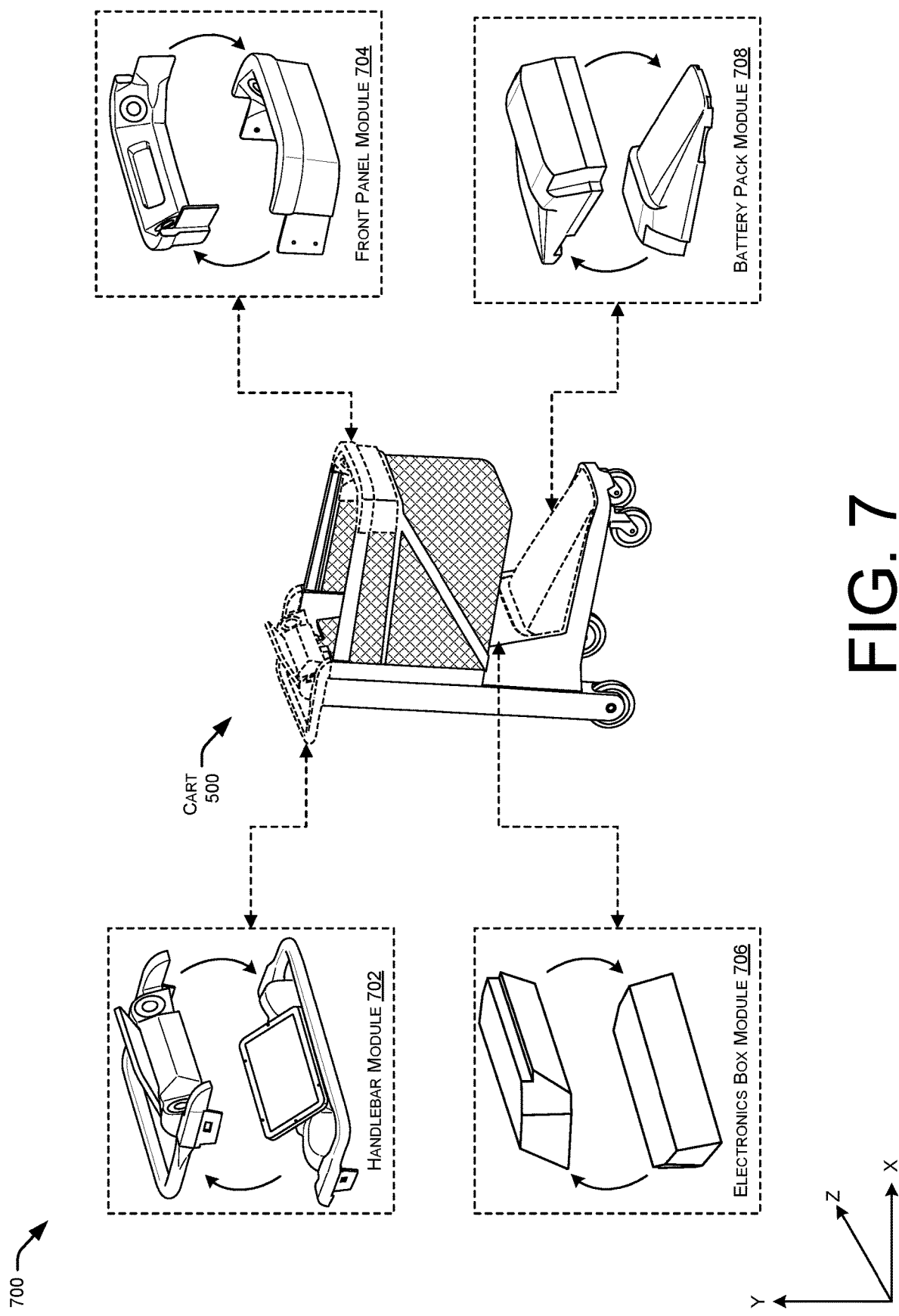
FIG. 7 illustrates perspective views of example perspective hardware components of an item-identifying cart.

FIG. 7 illustrates perspective views of example perspective hardware components of an item-identifying cart, such as the carts 102 and/or 500. The illustrated components are merely examples of how the hardware and/or software components of the cart 102 may be arranged and designed, but other embodiments or examples are equally usable to implement the techniques described herein by the cart 500.

As shown, a handlebar module 702 may be positioned proximate the back of the cart 500 and may include at least two imaging devices 412, the display 110, and the handle 406. The handlebar module 702 may further include the first imaging device 412(1) and/or other components described above. For example, the handlebar module 402 may further include one or more microphones and one or more loudspeakers to facilitate dialogues with a user 202, and/or provide other auditory feedback and notifications. Although illustrated as having imaging devices 412 above the top of the basket, in some examples, the imaging devices may be positioned below the top of the basket. Additionally, in some examples the imaging devices 136 may be oriented such that their viewing frustum is facing downward into the basket.

The cart 500 may also include a front panel module 704 that includes two or more imaging devices 412, as illustrated. In some examples, the front panel module 704 may be mounted to the basket 404 of the cart 500 and have the handle 406(2) for pulling the front panel module 704 off the cart 500, as well as for pulling the cart along a surface. The front panel module 704 may be positioned such that the included imaging devices 412 are not occluded by other components of the cart 500.

The cart 500 also includes an electronics box module 706 that may include various electronic components, such as hardware and/or software components, of the cart 500. The electronics box module 706 may be coupled to the frame 402 and/or basket 404 in the illustrated location to help protect components from damage. In some examples, the electronics box module 706 may include hardware processor(s) for the cart 500, memory, software components, and/or other control circuitry for the cart 500. The electronics box module 706 may receive power from the battery pack module, and control how the power is distributed to the other components or modules of the cart 102 (e.g., using I2C connections). Components of the electronics box module 706 are described further with respect to FIGS. 8A-B.

Further, the cart 500 may include a battery pack module 708, which may include one or more batteries that power the technology (e.g., sensors, processing system, etc.) on the cart 500. The battery pack module 708 may include provisions for one or more batters, relevant electronics (e.g. interface, power distribution/management, etc.), an LED status indicator (e.g., illustrating battery/system health), and a wire harness that connects to the electronics box module 706. The battery pack module 708 may include the power distribution board that will regulate power from the battery (ies) provided to the electronics box module 706. In some examples, the cart 500 may also include one or more internal batteries and/or capacitors to "hot swap" the battery pack module 708 (e.g., temporarily power components of the cart 500 while battery pack modules 708 are swapped out on the cart 500 to replace a dead battery pack module 708 with a charged battery pack module 708).

Figure 8A:
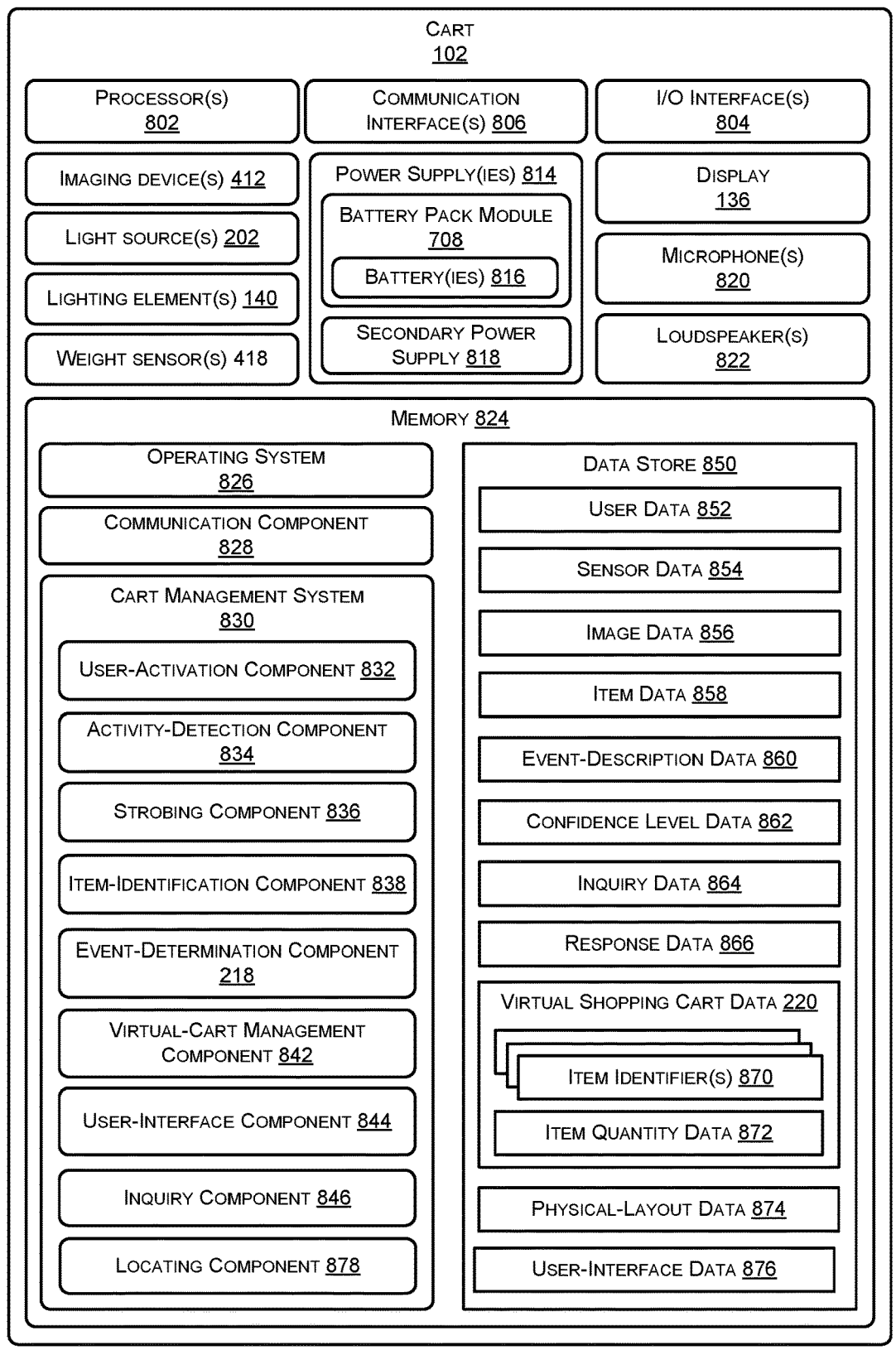
FIG. 8A illustrates example components of an item-identifying cart configured to support at least a portion of the functionality of a cart management system.

FIG. 8A illustrates example components of an item-identifying cart (e.g., carts 102 and/or 500) configured to support at least a portion of the functionality of a cart management system.

The cart 102 may include one or more hardware processors 802 (processors) configured to execute one or more stored instructions. The processors 802 may comprise one or more cores. The cart 102 may include one or more input/output (I/O) interface(s) 804 to allow the processor 802 or other portions of the cart 102 to communicate with other devices. The I/O interfaces 804 may comprise Inter-Integrated Circuit (I2C), Serial Peripheral Interface bus (SPI), Universal Serial Bus (USB) as promulgated by the USB Implementers Forum, and so forth. The I/O interfaces 804 may allow the various modules/components (e.g., handlebar module 702, front panel module 704, electronics box module 706, battery pack module 708, etc.) to communicate with each other and/or control each other.

The cart 102 may also include one or more communication interfaces 806. The communication interfaces 806 are configured to provide communications between the cart 102 and other devices, such as the server(s) 212, sensors, interface devices, routers, and so forth. The communication interfaces 806 may include devices configured to couple to personal area networks (PANs), wired and wireless local area networks (LANs), wired and wireless wide area networks (WANs), and so forth. For example, the communication interfaces 806 may include devices compatible with Ethernet, Wi-Fi™, and so forth. The cart 102 may also include one or more busses or other internal communications hardware or software that allow for the transfer of data between the various modules and components of the cart 102.

The cart 102 may also include the one or more imaging devices 412, such as the first imaging device 412(1) for identifying a user operating the cart and one or more second imaging devices 412(2)-(N) for identifying items placed into and removed from a basket of the cart. The cart 102 may further include the light sources 414, the lighting elements 108, and the weight sensors 418 described above. In some instances, the cart 102 further includes include one or more proximity sensors comprising any type of sensor that is able to detect the presence of nearby objects without the need for physical contact (e.g., ToF sensors, PIR sensors, etc.). The imaging devices, meanwhile, may comprise any type of camera or imaging device configured to generate image data (and/or video data) or information descriptive of a plurality of picture elements or pixels. Additionally, in some instances the cart 102 may include one or more imaging devices that are outward-facing and that generate image data representing the facility 200 around the cart 102.

The cart 102 may include one or more power supply(ies) 814 to provide power to the components of the cart 102, such as the battery pack module 708. The power supply(ies) 814 may also include a secondary (e.g., internal) power supply 818 to allow for hot swapping of battery pack modules 708, such as one or more capacitors, internal batteries, etc.

The cart 102 may also include a display 110 configured to display image data, such as pictures, videos, user interface elements, and/or any other image data. The display 110 may comprise any type of display 110, and may further be a touch screen to receive touch input 108 from a user. The cart 102 may also include one or more microphones 820 and one or more loudspeakers 822 to facilitate a dialogue with a user 202, and/or to receive feedback from the user 202. The microphone(s) 820 may capture sound representing the user's speech, and the loudspeaker(s) 822 may output machine-generated words to facilitate a dialogue, prompt a user 202 for feedback on an item 104 and/or for other information, and/or output other alerts or notifications.

The cart 102 may include one or more memories 824 (e.g., in the electronics box module 706 along with the processor(s) 802). The memory 824 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 824 provides storage of computer-readable instructions, data structures, program modules, and other data for the operation of the cart 102. A few example functional modules are shown stored in the memory 824, although the same functionality may alternatively be implemented in hardware, firmware, or as a system on a chip (SOC).

The memory 824 may include at least one operating system (OS) component 826. The OS component 826 is configured to manage hardware resource devices such as the I/O interfaces 804, the communication interfaces 806, and provide various services to applications or components executing on the processors 802. The OS component 826 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 824. These components may be executed as foreground applications, background tasks, daemons, and so forth. A communication component 828 may be configured to establish communications with one or more of the sensors, one or more of the servers 212, or other devices. The communications may be authenticated, encrypted, and so forth.

The memory 824 may further store a cart management system 830. The cart management system 830 is configured to provide the item-identifying and event-determining functions (and other functions) provided by the cart 102 as described herein. For example, the cart management system 830 may be configured to identify a user operating a cart, identify items 104 placed into the cart, determine results of events involving these items, and maintain a corresponding virtual shopping cart for a user 202 of the cart 102. While these components are described as operating on the cart 102, in some instances some or all of these components reside additionally or alternatively on the servers 212 or elsewhere.

The cart management system 830 may include a user-activation component 832 that performs operations for activating a shopping session using a cart 102 on behalf of a user 202. For instance, a user 202 may have previously registered for a user account with an operator of the facility to utilize various automated management services provided by an operator of the facility 200. The user 202 may have registered for a user account, such as by providing user data 852, to automate payments made for items taken by the user and included a payment means (e.g., credit card, bank account number, etc.), and may have also provided an identification means in the user data 852 to the user-activation component 832 such that the cart 102 can recognize the user 202. For instance, the user 202 may have registered to identify themselves to the cart 102 using any identification technique by the user-activation component 832, such as by providing user data 852 by presenting an identification means to the first imaging device 412(1) (e.g., presenting a driver's license, presenting a facility-issued card, presenting a user identifier via a mobile phone, etc.), speaking a predefined utterance that is captured by the microphone(s) 820 (e.g., a name of the user, a predefined keyword, etc.), and/or providing other recognition information. Once a user 202 has identified themselves to using the user-activation component 832, the user-activation component 832 may open a shopping session where the cart 102 identifies and track items 104 retrieved by the user 202 and placed in the cart 102.

The cart management system 830 may additionally include an activity-detection component 834 configured to detect items 104 (or objects) within a particular proximity to the cart. For example, one or more proximity sensor(s) (if present) may generate sensor data 854 that indicates a distance between the proximity sensor(s) 508 and any objects located in the FOV of the proximity sensor(s). The activity-detection component 834 may analyze the sensor data 854 and determine if an object is within a threshold distance indicating that the object is near the cart 102 and/or within or near the perimeter of the top of the basket 404 of the cart 102 (e.g., one foot from the proximity sensor(s), two feet from the proximity sensor(s), etc.). In this way, the proximity sensor(s) may generate sensor data 854 that indicates whether or not an item 104 is being moved in or out of the basket 404 of the cart 102. However, in some examples, rather than using sensor data 854 generated by a proximity sensor(s), the activity detection component 834 may utilize image data 856 generated by the imaging devices 412(2)-(N) to determine if an object is within a threshold distance from the cart 102. Further, and as described above, in some instances the event-determination component 218 may refrain from determining the result of an event until after the activity-detection component 834 determines that there any activity occurring within the basket 404 of the cart 102 has ceased.

The cart management system 830 may further include a strobing component 836 configured to cause the light sources 414 and/or shutters of the imaging devices 412 to strobe according to different frequencies. As noted above, the light sources 414 may emit light in any light spectrum (e.g., infrared, near infrared, visible, etc.). However, some items 104 may have text and/or other marking printed thereon using dye-based color inks that have diminished and/or similar near infrared (NIR) absorbance. This may lead to compromised contrast between, and essentially "washing out" of many distinct features in the visible spectrum when viewed in NIR. Accordingly, in some examples it may be advantageous to cause the light sources 414 to emit light in the visible spectrum. When generating image data 856 using the imaging devices 412, motion blur may appear when capturing fact moving objects. However, the motion blur may be reduced or eliminated by exposing the imaging device's imager for a short (e.g., sub-millisecond) durations. Accordingly, the strobing component 836 may strobe the opening and closing of shutters of the imaging devices 412 to limit the sensor exposure duration. Additionally, the strobing component 838 may cause the LEDs to emit/strobe light at a particular frequency, as discussed further with respect to FIG. 10. In some instances, the strobing component 838 may cause the LEDs to strobe at a first rate (e.g., 1200 hertz) prior to detecting predefined activity, such as a user placing an item into or removing an item from a cart, while causing the LEDs to strobe at a second, different rate (e.g., 60 hertz) upon identifying the predefined activity. Further, the LEDs may emit light in the visible range in some instances, and in the non-visible range in other instances. In some examples, the LEDs may comprise RGB LEDs that may be mixed according to different respective levels to tune a resulting color of the LEDs.

The cart management system 830 may also include an item-identification component 838 configured to analyze image data 856 to identify an item 104 represented in the image data 856. The image data 856 may comprise information descriptive of a plurality of picture elements, or pixels, for one or more image frames (e.g., a still picture, multiple picture frames, video frames, etc.). The item-identification component 838 may analyze the image data 856 using various image-processing techniques, or computer-vision techniques. For instance, the item-identification component 838 may extract a representation of an item 104 depicted in the image data 856 generated by at least one imaging device 412. The representation may include identifying text printed on the item 104, colors or color schemes printed in the item, determining 2-D and/or 3D shapes of the items 104, and/or other techniques for extract a representation of the item 104. In some instances, the representation of the item 104 depicted in the image data 856 may comprise a numeric representation, such as a feature vector or a set of feature vectors. In some instances, the item-identification component 838 identifies a barcode associated with a particular item.

In some examples, a data store 850 stored in the memory 824 may include item data 858, which may include representations of the items 104 offered for acquisition at the facility 200. The item-identification component 838 may compare the extracted represented of the item 104 with the "gallery" or stored representations of the known items 104 in the item data 858. In some instance, the item representation may include an indication of a barcode or SKU data for the item 104 as recognized in, or extracted from, the image data 856. The item-identification component 838 may determine confidence level data 862 based on the comparisons with item representation in the item data 858. The item-identification component 838 may determine, and assign, confidence levels indicating how likely it is that the item 104 represented in the image data 856 corresponds to an item from the item gallery in the item data 858. Based on the confidence level data 862, the item-identification component 838 may determine an item identifier 870 for the item in the image data 856 (or multiple item identifiers 870) that corresponds to an item in the item data 858 to which the item 104 corresponds. Further, and as described above, feedback may be provided to the user in response to the item-identification component 838 determining an identifier of an item with a confidence level that is greater than a threshold confidence level. For example, the lighting element 108 may emit green light, the display 110 may present an image or other identifying information associated with the item, or the like.

In some examples, the data store 850 may include physical-layout data 874 that is used by the item-identification component 838 to determine the item 104. The physical-layout data 874 may include or provide a mapping of physical locations within the physical layout of devices and objects such that the location of the cart 102 may be utilized to determine an item 104 stored nearby. The physical-layout data 874 may indicate the coordinates within the facility 200 of an inventory location 204, items 104 stored at that inventory location 204, and so forth. In examples where the cart 102 has location determining sensors (e.g., GPS, RFID, proximity, etc.), the location sensor data may be used to determine where in the store the user 202 is. In such examples, the item-identification component 838 may access the physical-layout data 874 to determine if a location associated with the event is associated with items 104, and confidence levels for the corresponding representations of items in the item data 858. Continuing the example above, given the location within the facility 200 of the event and image camera data, the physical-layout data 874 may determine the items 104 that may have been represented in generated images of the event 106.

The cart management system 830 may further include the event-determination component 218 to determine event-description data 860 for the item 104 in the image data 856. The event-determination component 218 may determine if the user 202 is adding an item 104 to the cart 102, removing the item from the cart 102, and/or the like. The event-determination component 218 may also determine a quantity of items involved, as described above. For instance, the event-determination component 218 may receive an indication of any identified items since the last update of the virtual shopping cart, along with weight-change data from the weight sensors to determine the result of one or more events associated with the identified items, as described above. Operation of the event-determination component 218 is described in further detail with reference to FIG. 8B.

The cart management system 830 may also include a virtual-cart management component 842 configured to manage virtual shopping cart data 220 for the cart 102. For instance, the virtual-cart management component 842 may utilize the item data 858, event-description data 860, and confidence level data 862 to add item identifier(s) 870 to the virtual shopping cart data 220 for items 104 that were added to the cart 102, remove item identifier(s) 870 from the virtual shopping cart data 220 for items 104 that were removed from the cart 102, and track item quantity data 872 indicating quantities of particular items 104 in the cart 102. In some instances, the virtual-cart management component 842 updates the virtual shopping cart data 220 in response to receiving information from the event-determination component 218, as described with reference to FIG. 8B below.

The cart management system 830 may further include a user-interface component 844 configured to present user interfaces on the display 110 based on user-interface data 876. The user interfaces 876 may include one or more fields to present data, and/or receive touch input (or other input via a keyboard, mouse, etc.) from a user 202, and/or any of the feedback described above. For instance, if the item-identification component 838 is unable to determine an item identifier 870 for an item 104 shown in the image data 856, the user-interface component 844 may receive inquiry data 864 generated by an inquiry component 846 to prompt a user 202 for feedback to help identify the item 104, and/or other information (e.g., if multiple items were placed in the cart 102). The inquiry component 846 may be configured to generate inquiry data 864 based on the information needed to identify the item 104. For instance, the inquiry data 864 may include a prompt to request particular feedback from the user 202, such as to provide input (e.g., touch input, vocal/utterance input, etc.) to identify the item 104, input to indicate how many items 104 were added to the cart, input to indicate whether an item 104 was removed or added, etc. In some examples, the user-interface component 844 may present one or more images depicting items from the item data 858 that have the highest confidence levels as corresponding to the item 104 in the image data 856, but confidence levels that are not high enough to make a final decision as to the item 104. For instance, the user-interface component 844 may present pictures of two different items that have high confidence levels 862 and request that the user 202 select or indicate the appropriate item 104. Additionally, or alternatively, the user-interface component 844 may present user-interface data 876 that prompts the user for feedback regarding whether or not the item 104 was added to, or removed from, the cart 102.

In some examples, the cart management system 830 may further include a locating component 878 configured to determine locations of the cart 102 in the facility 200. For instance, the locating component 878 may analyze sensor data 854 collected by sensors of the cart 102 to determine a location. In some examples, the communication interface(s) 806 may include network interfaces that configured the cart 102 to receive or detect wireless signals (e.g., WiFi signals, Bluetooth signals, etc.) and generate sensor data 854 indicative of the signals. The locating component 878 may analyze the sensor data 854 using various techniques to identify the location of the cart 102, such as WiFi triangulation, received signal strength indicators (RSSI), and/or other methods for analyzing wireless signals to determine a location of the cart 102. In some instances, the facility 200 may include various infrared (IR) or near-IR emitters at different locations that emit light according to frequencies, patterns, etc. that indicate the different locations in the facility 200. In such examples, the cart 102 may include a light sensor to generate the sensor data 854 representing the IR or NIR and determine the location of the cart 102 in the facility. In some instances, there may be visible landmarks or markers throughout the facility that indicate a location in the facility, and the locating component 878 may analyze image data 856 generated by an outward facing camera to determine a location of the cart 102. As another example, there may be various radio frequency (RF) emitters positioned throughout the store, and the cart 102 may include an RF receiver to allow the locating component 878 to perform IR beaconing to determine the location of the cart 102. The locating component 878 may perform one, or any combination, of the above techniques to determine a location of the cart 102 in the facility and/or any other technique known in the art.

The locating component 878 may perform various operations based on determining the location of the cart 102 within the facility 200. For instance, the locating component 878 may cause user interface data 876 to be presented on the display 110 that includes a map of the facility 200 and/or directions to an item 104 for the user of the cart 102. Additionally, or alternatively, the locating component 878 may utilize the location of the cart, the physical-layout data 874, and/or item data 858 and "push" user interfaces to the display 110 that indicate various location-based information, such as indications of deals for items 104 located nearby, indications of items 104 located nearby and on the user's shopping list, and/or other user interface data 876.

Figure 8B:
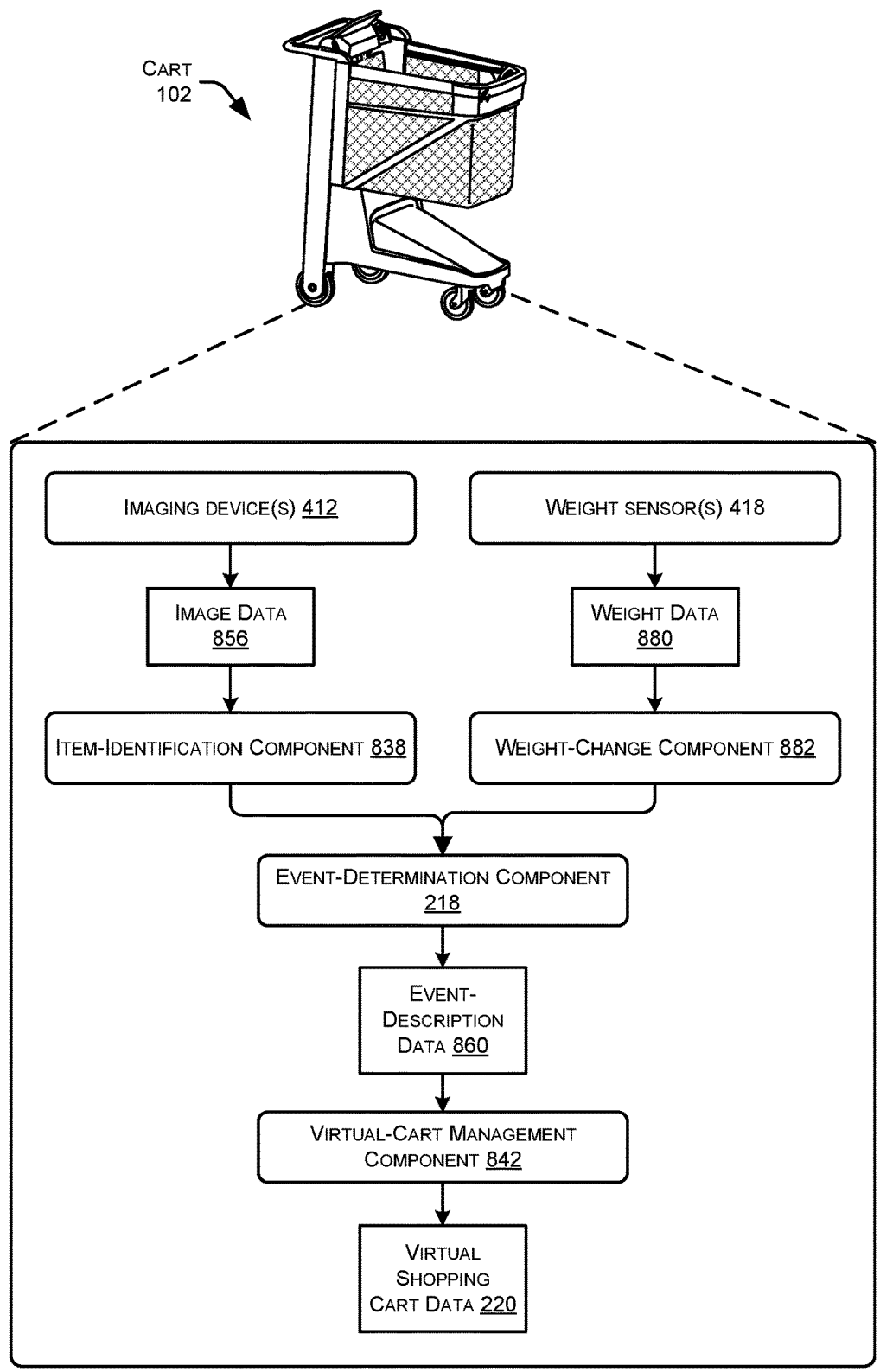
FIG. 8B illustrates some of the example components of FIG. 8A for determining whether to update a virtual cart of a user operating the item-identifying cart.

FIG. 8B illustrates, in further detail, some of the example components of the cart 102 for determining whether to update a virtual cart of a user operating the item-identifying cart 102. As illustrated, the imaging device 412 may generate image data 856, potentially as a user places one or more items into the cart 102 or removes one or more items from the cart 102. The item-identification component 838 receives the image data and may analyze the image data to identify one or more items represented in the image data, as described above.

Furthermore, before, after, and/or during the generating of the image data 856, the weight sensors may generate weight data 880 (e.g., a subset of the sensor data 854) indicating a weight of the basket 404 of the cart 102. A weight-change component 882 may receive the weight data 880 and may determine when the weight data 880 indicates that the weight of the basket 404 has stabilized. That is, the weight-change component 882 may continuously or periodically receive the weight data 880 and may determine when the weight data 880 does not change by more than a threshold amount for a predefined amount of time and, thus, has stabilized. In some instances, this may occur in response to the user ceasing to push or otherwise move the cart. In addition to determining when the weight of the basket has stabilized, the weight-change component 882 may determine when a weight change has occurred. That is, the weight-change component 882 may determine a difference between a current, stabilized weight and a previous weight at a time when the virtual shopping cart data 220 was last updated. If this difference is greater than a threshold, then the weight-change component 882 may provide an indication of this difference to the event-determination component 218.

The event-determination component 218 may receive an indication of any identified items from the item-identification component 838 and an indication of a weight change (and amount) from the weight-change component 882. The event-determination component may then determine the outcome of any events involving the identified items. As described above, the event-determination component 838 may make this determination by looking up a catalog weight associated with each of the identified items and generating one or more hypotheses based on these catalog weight(s), the change in weight of the basket, and one or more other criteria, such as the probability of individual actions. As described above, these actions may be weighted based on prior behavior of the user, behavior of users when interacting with the identified items, behavior of users at the same facility, current contents of the virtual shopping cart data 220, and/or the like.

If the event-determination component 218 determine the outcome of any events involving the identified item with a confidence level that is greater than a threshold confidence level, then the event-determination component 218 may generate the event-description data 860. The virtual-cart management component 842 may receive this event-description data and update the virtual shopping cart data 220 associated with the user operating the mobile cart. For example, if the event description data indicates that it has determined that a user placed three instance of item A into the cart and removed one instance of item B from the cart, the virtual-cart management component 842 may update the virtual shopping cart data 220 to indicate these additions and this removal.

Figure 9:
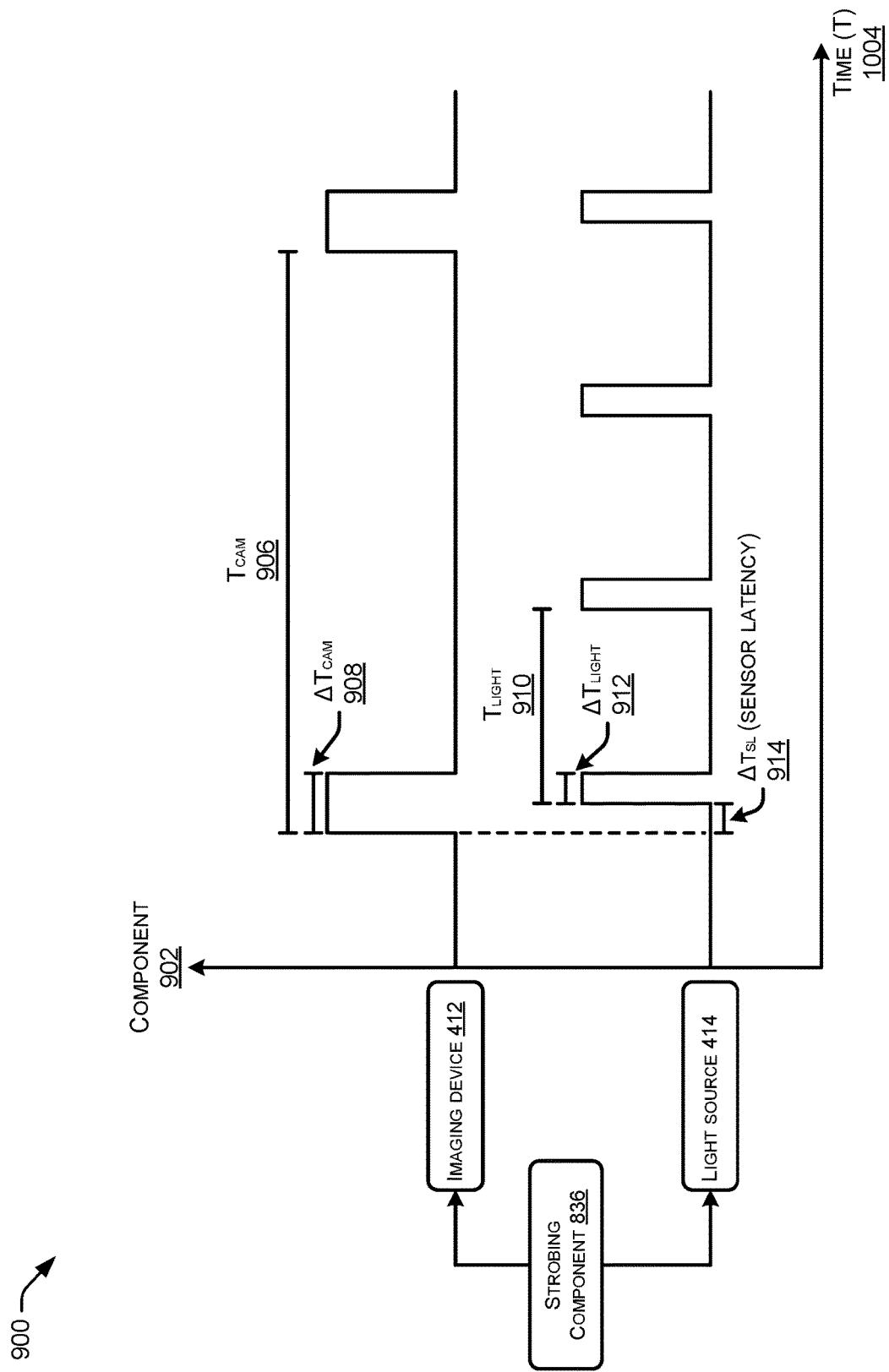
FIG. 9 illustrates an example timing diagram for strobing visible light from an LED and a camera shutter at respective strobe frequencies.

FIG. 9 illustrates an example timing diagram 900 for strobing a light source 414 and an imaging device 412 shutter at respective strobe frequencies. As illustrated, the strobing component 836 may cause the strobing of the imaging device 412 shutter and the light source at different frequencies. As noted above, the light source 414 may emit light in any light spectrum (e.g., infrared, near infrared, visible, etc.). However, some items 104 may have text and/or other marking printed thereon using dye-based color inks that have diminished and/or similar near infrared (NIR) absorbance. This may lead to compromised contrast between, and essentially "washing out" of, many distinct features in the visible spectrum when viewed in NIR. Accordingly, in some examples it may be advantageous to cause the light source 414 to emit light in the visible spectrum. When generating image data 856 using imaging device 412, motion blur may appear when capturing fast moving objects. However, the motion blur may be reduced or eliminated by exposing the imaging device 412 imager for a short (e.g., sub-millisecond) durations. Accordingly, the strobing component 836 may strobe the opening and closing of shutters of the imaging device 412 to limit the sensor exposure duration. Additionally, the strobing component 838 may cause the LEDs to emit/strobe light at a particular frequency.

As shown, the timing diagram illustrates the strobing frequency of components 902 (e.g., imaging device 412 and light source 414) over time (T) 904. Thus, the strobing component 836 causes the imaging device 412 shutter to open and close according to a frequency over time 904 and causes at least one light source 414 to activate and deactivate according to a particular frequency over time. As illustrated, the imaging device 412 may have a frequency or capture cycle exposure between respective openings (or "pulses") of $T_{CAM}$ 906, and is pulsed, or has its shutter open, for a $\Delta T_{CAM}$ 908. Generally, to help reduce blur, the exposure time $\Delta T_{CAM}$ 908 for the imager of the imaging device 412 may be relatively low to help reduce motion (e.g., 50 μs, 500 μs, 600 μs, etc.). additionally, to help reduce blur, the frequency at which the imaging device 412 is opened $T_{CAM}$ 906 may be larger than the frequency at which the light source 414 is strobed $T_{LIGHT}$ 910 (e.g., larger by a factor of 3 as illustrated).

Similarly, the strobing component 836 may cause the light source 414 to activate and deactivate according to a particular frequency. For instance, the light source 414 may have a strobing cycle of $T_{LIGHT}$ 910 with a sensor latency from the initiation of $T_{CAM}$ 906 of $\Delta T_{SL}$ 914. Additionally, the light source 414 may have an emit time, or pulse time, of $\Delta T_{LIGHT}$ 912.

In instances where the light source 414 emits visible light, it may be advantageous to strobe the light source 414 at frequencies at which humans do not perceive the strobing. For instance, when light sources 414 are strobed at lower frequencies that are perceptible to humans, the strobing of the light may induce seizures in some humans. Accordingly, to avoid seizure-inducing strobing of the light source 414, the strobing component 836 may cause the light source 414 to strobe visible light on and off at a high enough frequency to be imperceptible (e.g., greater than 80 Hz, in the range of 80 Hz-300 Hz, etc.).

In some examples, the light source 414 may be activated for a period of time $\Delta T_{LIGHT}$ 912 that at least partially overlaps with the period of time $\Delta T_{CAM}$ 908 the shutter of the imaging device 412 is open. In some examples, the period of time $\Delta T_{LIGHT}$ 912 may be less than $\Delta T_{CAM}$ 908, which may be due to sensor latency $\Delta T_{SL}$ 914.

Figure 10:
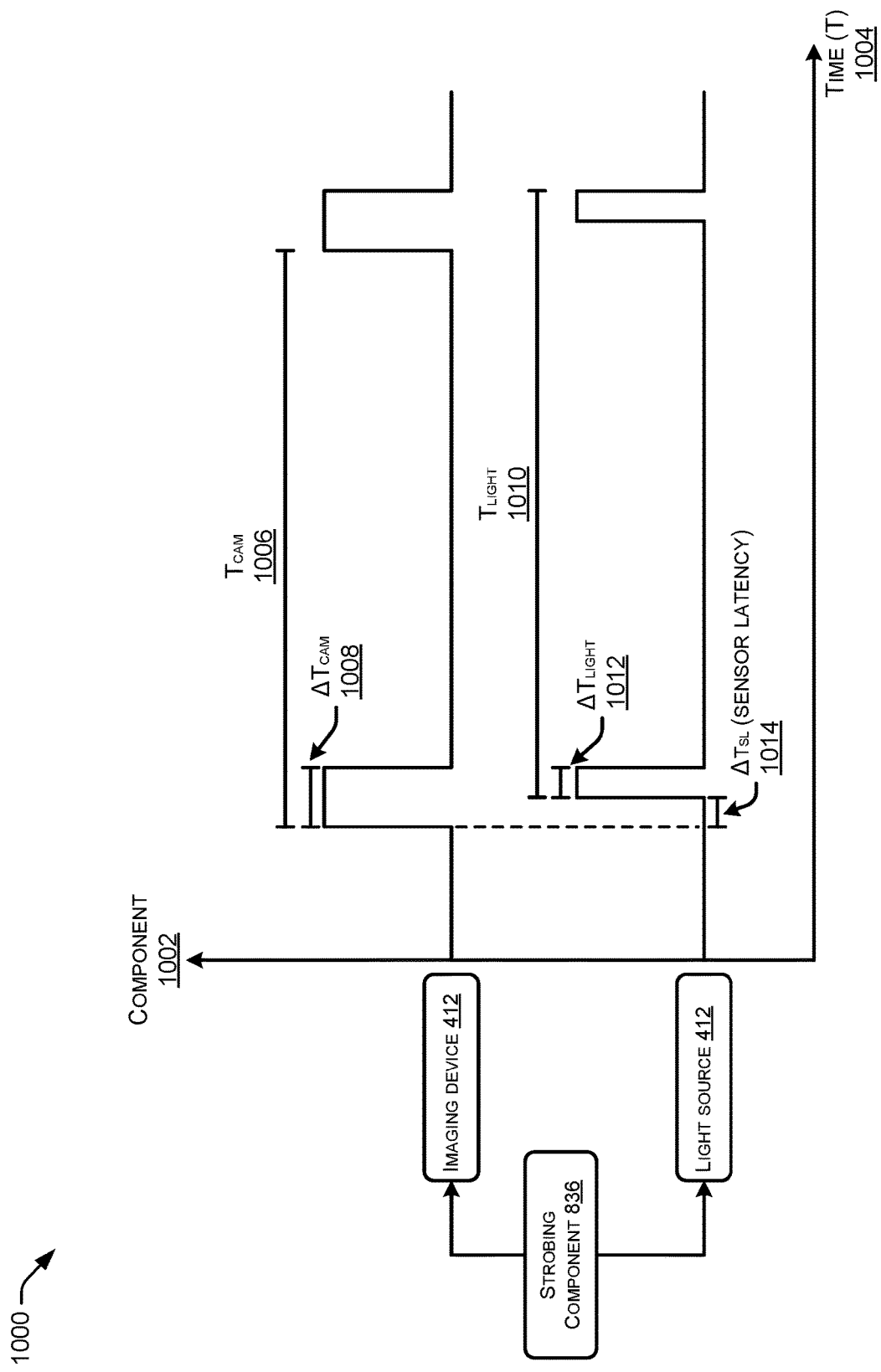
FIG. 10 illustrates another example timing diagram for strobing infrared or near-infrared light from an LED and a camera shutter at respective strobe frequencies.

FIG. 10 illustrates another example timing diagram 1000 for strobing infrared (IR) or near-infrared (NIR) light from a light source 414 and an imaging device 412 shutter at respective strobe frequencies. As illustrated, the strobing component 836 may cause the strobing of the imaging device 412 shutter and the light source 414 at the same frequency. Because IR and NIR light is not visible to humans, there is no concern of emitting light by the light source 414 at frequencies that are seizure inducing. Accordingly, the imaging device 412 may open and close the shutter according to a first frequency defined by a time period of $T_{CAM}$ 506, and is pulsed, or has its shutter open, for a $\Delta T_{CAM}$ 508. In instances where the light source 414 emits IR or NIR light, the light source 414 may also be strobed according to a same frequency that is defined by a time period of $T_{LIGHT}$ 1010 with a sensor latency from the initiation of $T_{CAM}$ 1006 of $\Delta T_{SL}$ 1014. Additionally, the light source 414 may have an emit time, or pulse time, of $\Delta T_{LIGHT}$ 1012. In various examples, the light source 414 may emit light during at least a portion of time $\Delta T_{CAM}$ 1008 when the shutter of the imaging device 412 is open.

Figure 11:
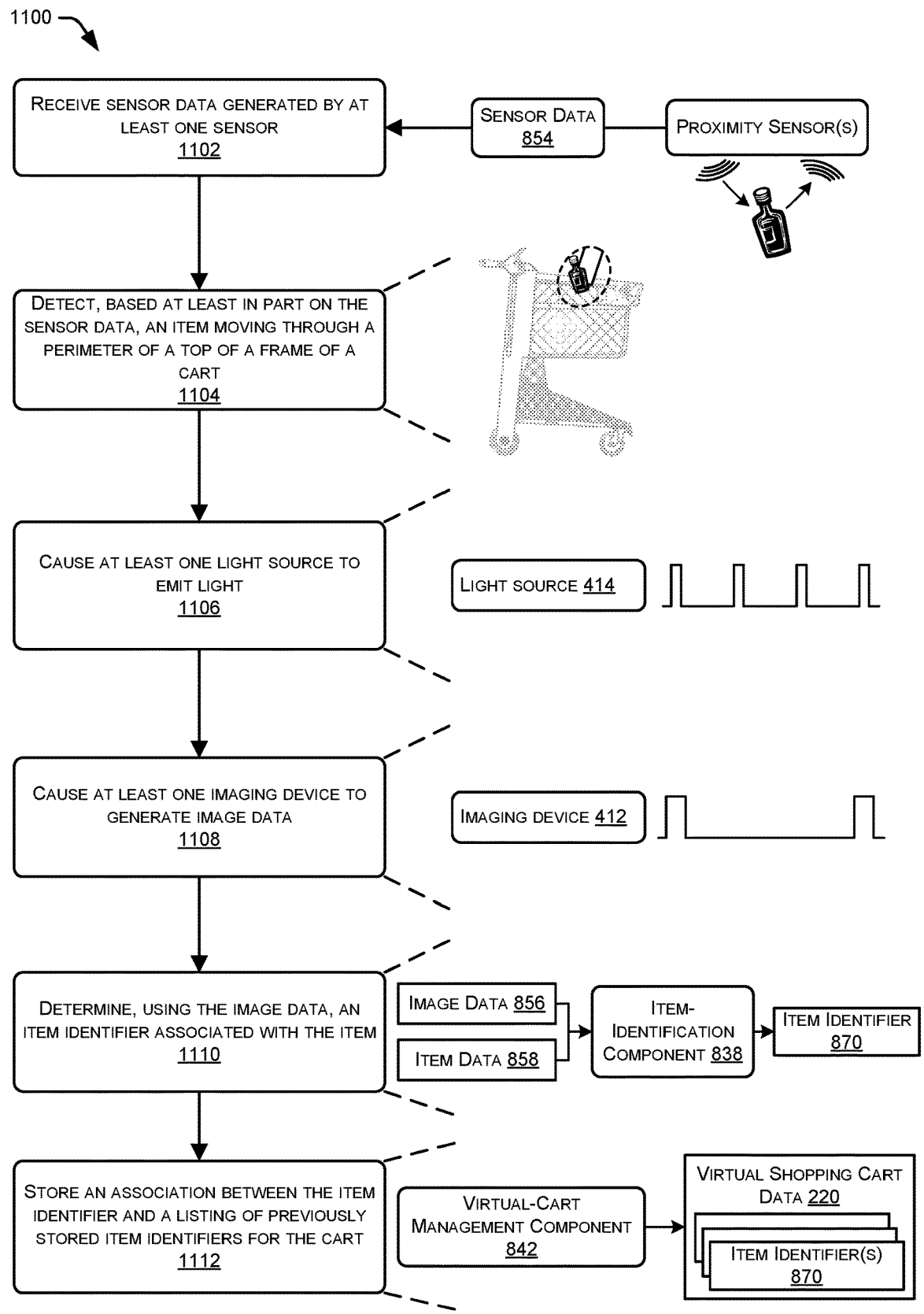
FIG. 11 illustrates a flow diagram of an example process for identifying an item placed into an item-identifying cart.

FIG. 11 illustrates a flow diagram of an example process 1100 for an item-identifying cart to identify an item placed in the cart. At 1102, the processor(s) 802 of the cart 102 may receive sensor data 854 generated by at least one sensor, such as a proximity sensor (e.g., a ToF sensor, a PIR sensor, and/or another proximity sensor), a camera, and/or the like. It is to be appreciate that while FIG. 11 illustrates one or more proximity sensors generating the data, in other instances the cart may be free from the proximity sensors and, thus, the sensor data from which activity is detected may be generated by one or more other sensors, as described in detail above and below.

At 1104, the processor(s) 802 of the cart 102 may detect, based at least in part on the sensor data 854, an item 104 moving through a perimeter of a top of a frame of the cart 102.

At 1106, the processor(s) 802 of the cart 102 may cause at least one light source to emit light. For instance, the processor(s) 802 of the cart 102 may cause the strobing component 836 to activate and deactivate (or pulse) an LED at a particular frequency. In some instances, the LED may be all LEDs on the cart, multiple LEDs, and/or a single LED.

At 1108, the processor(s) 802 of the cart 102 may cause at least one imaging device 412 to generate image data 856. For instance, the processor(s) 802 of the cart 102 may cause the strobing component 836 to open and close the imaging device shutter at a particular frequency for predefined exposure periods.

At 1110, the processor(s) 802 of the cart 102 may determine, using the image data 856, an item identifier 870 associated with the item 104. For instance, the item-identification component 838 may extract feature data from the image data 858 and compare the feature data to representations of items in item data 858 for items 104 offered for acquisition in the facility 200. In some instances, the item data 856 that corresponds to the feature data for the item 104 in the image data 856 with the highest confidence level data 862 may have its respective item identifier 870 selected.

At 1112, the processor(s) 802 of the cart 102 may store an association between the item identifier 870 and a listing of previously stored item identifiers 870 for the cart 102. For instance, the virtual-cart management component 842 may determine that the user 202 added an item 104 to the cart 102 and add an item identifier 870 for the item 104 (or items), and also an item quainty data 872 if multiple items were added.

Figure 12:
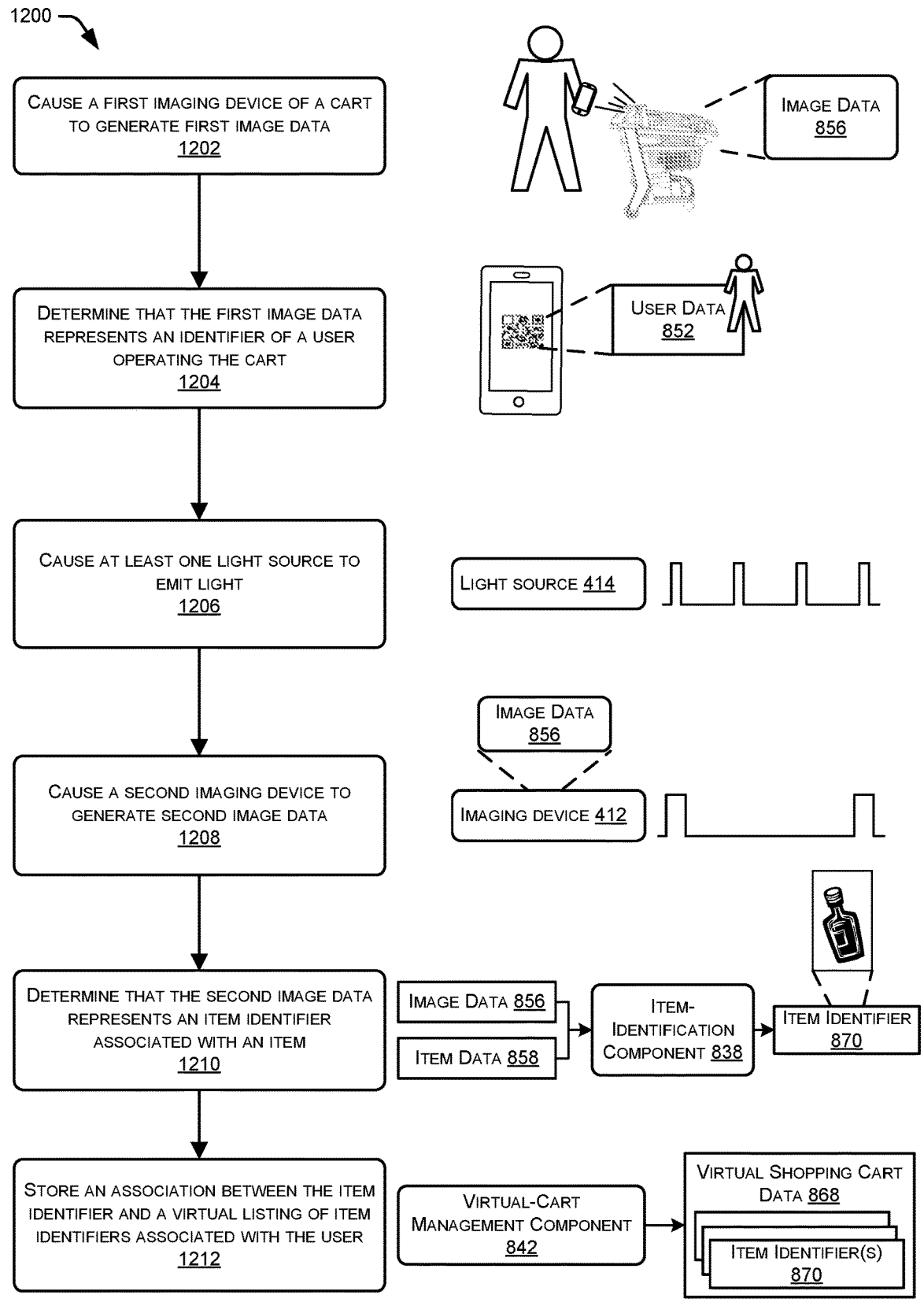
FIG. 12 illustrates a flow diagram of another example process for identifying a user operating an item-identifying cart and an item placed into an item-identifying cart.

FIG. 12 illustrates a flow diagram of another example process 1200 for identifying a user operating an item-identifying cart and an item placed into an item-identifying cart. At 1202, an item-identifying cart may cause a first imaging device of a cart to generate first image data. For example, a user operating the cart may press a physical or soft button, may issue a voice command, or may otherwise provide a command to cause the imaging device to generate the first image data. In other instances, the first imaging device may detect presence of an object and, in response, may generate the first image data. In either instance, the first imaging device may be positioned with an FOV directed towards the location of a user operating the cart.

At 1204, the cart or a remote server may determine that the first image data represents an identifier of the user operating the cart, such as a code (e.g., barcode) presented on a display of a mobile phone, or the like. In some instances, the cart and/or the remote server may identify an account of the user and may store an indication that the subsequent shopping session associated with the cart is to be associated with the identified account.

At 1206, the cart may cause at least one light source to emit light. As described above, the light source may periodically or continuously emit light during operation of the cart, or the light source may do so in response to a proximity sensor detecting an object. In either instance, at 1308 the cart may cause at least a second imaging device to generate second image data. In some instance, this may comprise instructing one or more of the second imaging devices 412(2)-(N) to generate the second image data.

At 1210, the cart or the remote server may determine that the second image data represents an item identifier associated with an item. For example, the second image data may be used to identify a barcode of the item, visual characteristics of the item, or the like, which in turn may be used by the item-identification component to determine an item identifier 870 of the item.

At 1212, the cart or the remote server may store an association between the item identifier and a virtual listing of item identifiers associated with the identified users. For example, the cart may indicate addition of an item identifier corresponding to the item placed in the cart in a virtual shopping cart of the user identified at 1304.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

Figure 13:
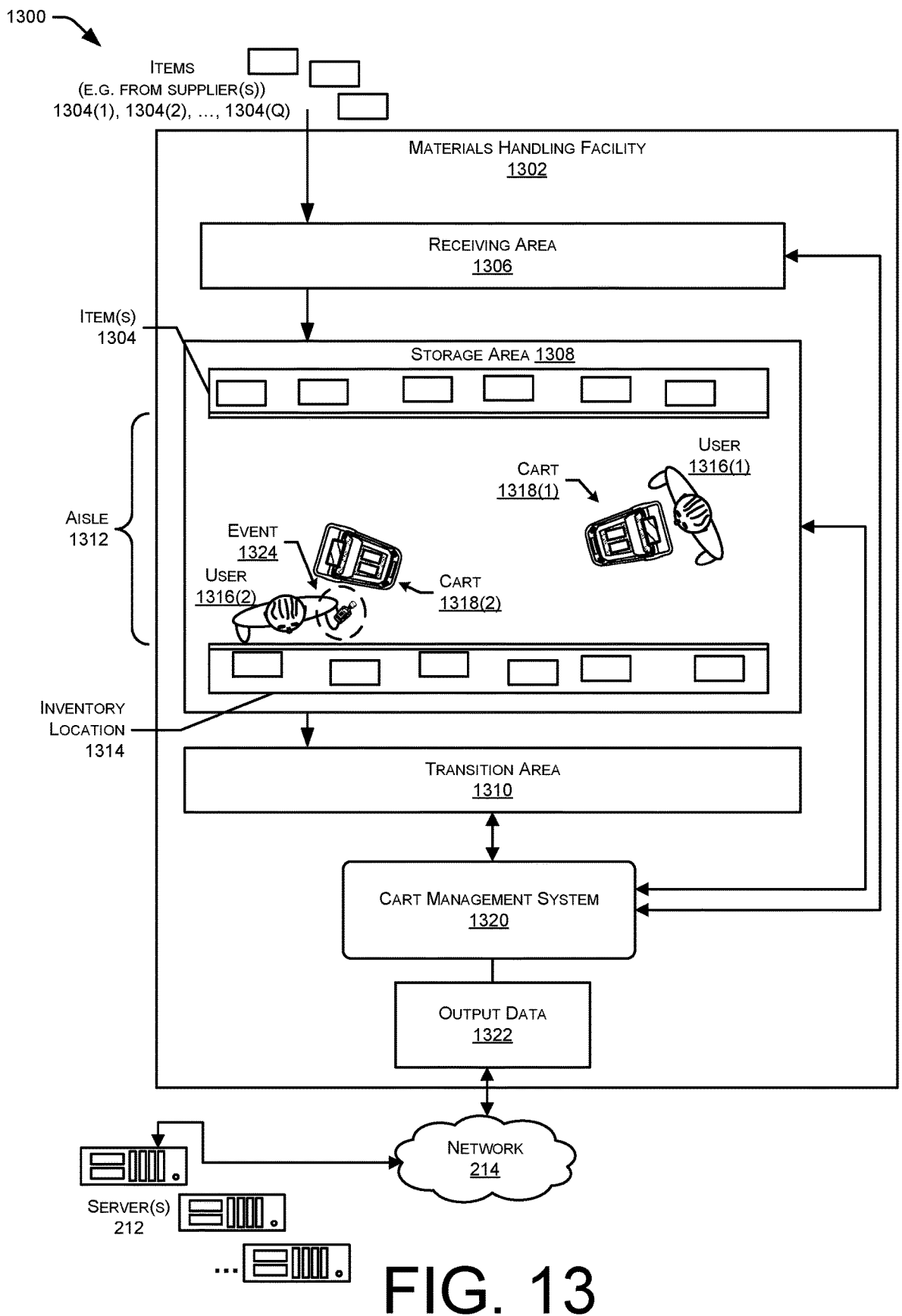
FIG. 13 is a block diagram of an example materials handling facility that includes item-identifying carts and a cart management system configured to generate output regarding events occurring in the cart using sensor data.

FIG. 13 is a block diagram 1300 of an example materials handling facility 1302 that includes item-identifying carts and a cart management system configured to generate output regarding events occurring in the cart using sensor data. However, the following description is merely one illustrative example of an industry and environment in which the techniques described herein may be utilized.

An implementation of a materials handling facility 1302 (e.g., facility 200) configured to store and manage inventory items is illustrated in FIG. 13. A materials handling facility 1302 (facility) comprises one or more physical structures or areas within which one or more items 1304(1), 1304(2), . . . , 1304(Q) (generally denoted as 1304) may be held. As used in this disclosure, letters in parenthesis such as "(Q)" indicate an integer result. The items 1304 comprise physical goods, such as books, pharmaceuticals, repair parts, electronic gear, groceries, and so forth.

The facility 1302 may include one or more areas designated for different functions with regard to inventory handling. In this illustration, the facility 1302 includes a receiving area 1306, a storage area 1308, and a transition area 1310. The receiving area 1306 may be configured to accept items 1304, such as from suppliers, for intake into the facility 1302. For example, the receiving area 1306 may include a loading dock at which trucks or other freight conveyances unload the items 1304.

The storage area 1308 is configured to store the items 1304. The storage area 1308 may be arranged in various physical configurations. In one implementation, the storage area 1308 may include one or more aisles 1312. The aisles 1312 may be configured with, or defined by, inventory locations 1314 on one or both sides of the aisle 1312. The inventory locations 1314 may include one or more of shelves, racks, cases, cabinets, bins, floor locations, or other suitable storage mechanisms for holding or storing the items 1304. The inventory locations 1314 may be affixed to the floor or another portion of the facility's structure, or may be movable such that the arrangements of aisles 1312 may be reconfigurable. In some implementations, the inventory locations 1314 may be configured to move independently of an outside operator. For example, the inventory locations 1314 may comprise a rack with a power source and a motor, operable by a computing device to allow the rack to move from one location within the facility 1302 to another.

One or more users 1316(1), 1316(2), . . . , 1316(U), carts 1318(1), 1318(2), . . . , 1318(T) (generally denoted as 1318) or other material handling apparatus may move within the facility 1302. For example, the users 1316 may move about within the facility 1302 to pick or place the items 1304 in various inventory locations 1314, placing them on the carts 1318 for ease of transport. An individual cart 1318 is configured to carry or otherwise transport one or more items 1304. For example, a cart 1318 may include a basket, a cart, a bag, and so forth. In other implementations, other agencies such as robots, forklifts, cranes, aerial drones, and so forth, may move about the facility 1302 picking, placing, or otherwise moving the items 1304.

One or more sensors may be configured to acquire information in the facility 1302. The sensors in the facility 1302 may include sensors fixed in the environment (e.g., ceiling-mounted cameras) or otherwise, such as sensors in the possession of users (e.g., mobile phones, tablets, etc.) or sensors mounted on the carts 1318. The sensors may include, but are not limited to, cameras, weight sensors (e.g., in the bottom of the carts 1318), radio frequency (RF) receivers, temperature sensors, humidity sensors, vibration sensors, and so forth. The sensors may be, in some examples, in or on the cart 1318 or another location in the facility 1302. In one example, the bottom of a basket of the carts 1318 may include weight sensors configured to determine a weight of the items 1304 placed thereupon.

During operation of the facility 1302, the sensors may be configured to provide information suitable for identifying the movement of items 1304 or other occurrences within the cart 1318. For example, a series of images acquired by a camera may indicate removal of an item 1304 from a particular cart 1318 by one of the users 1316 and/or placement of the item 1304 on or at least partially within one of the carts 1318.

While the storage area 1308 is depicted as having one or more aisles 1312, inventory locations 1314 storing the items 1304, sensors, and so forth, it is understood that the receiving area 1306, the transition area 1310, or other areas of the facility 1302 may be similarly equipped. Furthermore, the arrangement of the various areas within the facility 1302 is depicted functionally rather than schematically. For example, multiple different receiving areas 1306, storage areas 1308, and transition areas 1310 may be interspersed rather than segregated in the facility 1302.

The carts 1318 may include, or be coupled to, a cart management system 1320 (e.g., cart management system 830). The cart management system 1320 is configured to identify interactions with and between users 1316 and carts 1318, in one or more of the receiving area 1306, the storage area 1308, or the transition area 1310. These interactions may include one or more events 1324. For example, events 1324 may include placing of an item 1304 in a cart 1318, returning of an item 1304 from the cart 1318 to an inventory location 1314, and so forth. Other events 1324 involving users 1316 may include the user 1316 providing authentication information in the facility 1302, using a computing device at the facility 1302 to authenticate identity to the cart management system 1320, and so forth.

By determining the occurrence of one or more of the events 1324, the cart management system 1320 may generate output data 1322. The output data 1322 comprises information about the event 1324. For example, where the event 1324 comprises an item 1304 being removed from, or placed in, a cart 1318, the output data 1322 may comprise an item identifier indicative of the particular item 1304 that was removed from, or placed in, the cart 1318, a quantity of the item 1304, a user identifier of a user that removed the item 1304, and/or other output data 1322.

The cart management system 1320 may use one or more automated systems to generate the output data 1322. For example, an artificial neural network, one or more classifiers, or other automated machine learning techniques may be used to process the sensor data and/or image data from the one or more sensors to generate output data 1322. The automated systems may operate using probabilistic or non-probabilistic techniques. For example, the automated systems may use a Bayesian network. In another example, the automated systems may use support vector machines to generate the output data 1322 or the tentative results. The automated systems may generate confidence level data that provides information indicative of the accuracy or confidence that the output data 1322 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 135%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 1304 may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 1316 may pick an item 1304(1) such as a perfume bottle that is generally cubical in shape from the inventory location 1314. Other items 1304 at nearby inventory locations 1314 may be predominately spherical. Based on the difference in shape (cube vs. sphere) from the adjacent items, and the correspondence in shape with the previously stored image of the perfume bottle item 1304(1) (cubical and cubical), the confidence level that the user 202 has picked up the perfume bottle item 1304(1) is high.

In some situations, the automated techniques may be unable to generate output data 1322 with a confidence level above a threshold result. For example, the automated techniques may be unable to distinguish which item 1304 in large a group of items a user 1316 has picked up from the inventory location 1314 and placed in the cart 1318. In other situations, it may be desirable to provide human confirmation of the event 1324 or of the accuracy of the output data 1322. For example, some items 1304 may be deemed age restricted such that they are to be handled only by users 1316 above a minimum age threshold.

In instances where human confirmation is desired, sensor data associated with an event 1324 may be processed to generate inquiry data. The inquiry data may include a subset of the sensor data associated with the event 1324. The inquiry data may also include one or more of one or more tentative results as determined by the automated techniques, or supplemental data. The subset of the sensor data may be determined using information about the one or more sensors. The subset of the sensor data may include images that may show the item 1304 being placed in, or removed from, the cart 1318. The subset of the sensor data may also omit images from other cameras that did not have that item 1304 in the field of view. The field of view may comprise a portion of the scene in the cart 1318 that the camera is able to generate sensor/image data about.

Continuing the example, the subset of the sensor data may comprise a video clip acquired by one or more cameras having a field of view that includes the item 1304. The tentative results may comprise the "best guess" as to which items 1304 may have been involved in the event 1324. For example, the tentative results may comprise results determined by the automated system that have a confidence level above a minimum threshold.

The facility 1302 may be configured to receive different kinds of items 1304 from various suppliers and to store them until a customer orders or retrieves one or more of the items 1304. A general flow of items 1304 through the facility 1302 is indicated by the arrows of FIG. 13. Specifically, as illustrated in this example, items 1304 may be received from one or more suppliers, such as manufacturers, distributors, wholesalers, and so forth, at the receiving area 1306. In various implementations, the items 1304 may include merchandise, commodities, perishables, or any suitable type of item 1304, depending on the nature of the enterprise that operates the facility 1302. The receiving of the items 1304 may comprise one or more events 1324 for which the cart management system 1320 may generate output data 1322.

Upon being received from a supplier at receiving area 1306, the items 1304 may be prepared for storage. For example, items 1304 may be unpacked or otherwise rearranged. An inventory management system of the facility 1302 may include one or more software applications executing on a computer system to provide inventory management functions based on the events 1324 associated with the unpacking or rearrangement. These inventory management functions may include maintaining information indicative of the type, quantity, condition, cost, location, weight, or any other suitable parameters with respect to the items 1304. The items 1304 may be stocked, managed, or dispensed in terms of countable, individual units or multiples, such as packages, cartons, crates, pallets, or other suitable aggregations. Alternatively, some items 1304, such as bulk products, commodities, and so forth, may be stored in continuous or arbitrarily divisible amounts that may not be inherently organized into countable units. Such items 1304 may be managed in terms of measurable quantity such as units of length, area, volume, weight, time, duration, or other dimensional properties characterized by units of measurement. Generally speaking, a quantity of an item 1304 may refer to either a countable number of individual or aggregate units of an item 1304 or a measurable amount of an item 1304, as appropriate.

After arriving through the receiving area 1306, items 1304 may be stored within the storage area 1308. In some implementations, like items 1304 may be stored or displayed together in the inventory locations 1314 such as in bins, on shelves, hanging from pegboards, and so forth. In this implementation, all items 1304 of a given kind are stored in one inventory location 1314. In other implementations, like items 1304 may be stored in different inventory locations 1314. For example, to optimize retrieval of certain items 1304 having frequent turnover within a large physical facility 1302, those items 1304 may be stored in several different inventory locations 1314 to reduce congestion that might occur at a single inventory location 1314.

When a customer order specifying one or more items 1304 is received, or as a user 1316 progresses through the facility 1302, the corresponding items 1304 may be selected or "picked" from the inventory locations 1314 containing those items 1304. In various implementations, item picking may range from manual to completely automated picking. For example, in one implementation, a user 1316 may have a list of items 1304 they desire and may progress through the facility 1302 picking items 1304 from inventory locations 1314 within the storage area 1308 and placing those items 1304 into a cart 1318. In other implementations, employees of the facility 1302 may pick items 1304 using written or electronic pick lists derived from customer orders. These picked items 1304 may be placed into the cart 1318 as the employee progresses through the facility 1302. Picking may comprise one or more events 1324, such as the user 1316 in moving to the inventory location 1314, retrieval of the item 1304 from the inventory location 1314, and so forth.

After items 1304 have been picked, they may be processed at a transition area 1310. The transition area 1310 may be any designated area within the facility 1302 where items 1304 are transitioned from one location to another or from one entity to another. For example, the transition area 1310 may be a packing station within the facility 1302. When the item 1304 arrives at the transition area 1310, the items 1304 may be transitioned from the storage area 1308 to the packing station. Information about the transition may be maintained by the cart management system 1320 using the output data 1322 associated with those events 1324.

In another example, if the items 1304 are departing the facility 1302 a list of the items 1304 may be used by the cart management system 1320 to transition responsibility for, or custody of, the items 1304 from the facility 1302 to another entity. For example, a carrier may accept the items 1304 for transport with that carrier accepting responsibility for the items 1304 indicated in the list. In another example, a customer may purchase or rent the items 1304 and remove the items 1304 from the facility 1302.

The cart management system 1320 may access or generate sensor data about the items 1304, the users 1316, the carts 1318, and so forth. The sensor data may be acquired by one or more of the sensors, data provided by other systems, and so forth. For example, the sensors may include cameras configured to acquire image data of items 1304 placed in the carts 1318. The image data may comprise still images, video, or a combination thereof. The image data may be processed by the cart management system 1320 to determine an item identifier for the items 1304, a listing of items in the cart 1318 for a user 1316, and so forth. As used herein, the identity of the user of a cart 1318 may represent a unique identifier of the user (e.g., name, number associated with user, username, etc.), an identifier that distinguishes the user amongst other users being identified with the environment, or the like.

The cart management system 1320, or systems coupled thereto, may be configured to identify the user 1316. In one implementation, this determination may comprise comparing sensor data with previously stored identity data. For example, the user 1316 may be identified by providing biometric information to a biometric-recognition system, by presenting a token carrying authentication credentials, providing a fingerprint, scanning a barcode or other type of unique identifier upon entering the facility, and so forth. Identity of the user 1316 may be determined before, during, or after entry to the facility 1302 and/or interaction with a cart 1318. Determination of the user's 1316 identity may comprise comparing sensor data associated with the user 1316 in the facility 1302 and/or with the cart 1318 to previously stored user data. In some examples, the output data 1322 may be transmitted over a network 214 to server(s) 212.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   receiving first data representing an identifier of an item placed into or removed from a basket of a mobile cart;
   causing, prior to determining an event associated with the item, a display coupled to the mobile cart to present second data representing the item;
   receiving, after causing the display to present the second data, third data representing the event associated with the item; and
   causing, after receiving the third data, the display to present fourth data representing the event.

2. The method as recited in claim 1, wherein the causing the display to present the second data comprises causing the display to present second data representing the item and indicating that the mobile cart is processing the event associated with the item.

3. The method as recited in claim 1, wherein the causing the display to present the second data representing the item comprises causing the display to present text data associated with a name of the item and image data representing the item.

4. The method as recited in claim 1, wherein the causing the display to present the fourth data representing the event comprises causing the display to present a cost of the item, wherein the cost is based at least in part on a weight of the item.

5. The method as recited in claim 1, wherein the receiving the third data representing the event comprises receiving the third data based at least in part on a change in weight of the basket of the mobile cart based on the item being placed into or removed from the basket of the mobile cart.

6. The method as recited in claim 1, wherein the first data is generated using one or more cameras coupled to the mobile cart and the third data is generated using one or more weight sensors coupled to the mobile cart.

7. The method as recited in claim 1, further comprising causing the display to present fifth data representing a shopping list associated with a user operating the mobile cart.

8. A mobile cart comprising:
a frame defining a basket;
a display coupled to the frame;
one or more processors; and
one or more non-transitory computer-readable media storing computer-executable instructions that, when executed, cause the one or more processors to perform acts comprising:
receiving first data representing an identifier of an item placed into or removed from the basket;
causing, prior to determining an event associated with the item, the display to present second data representing the item;
receiving, after causing the display to present the second data, third data representing the event associated with the item; and
causing, after receiving the third data, the display to present fourth data representing the event.

9. The mobile cart as recited in claim 8, wherein the causing the display to present the second data comprises causing the display to present second data representing the item and indicating that the mobile cart is processing the event associated with the item.

10. The mobile cart as recited in claim 8, wherein the causing the display to present the second data representing the item comprises causing the display to present text data associated with a name of the item and image data representing the item.

11. The mobile cart as recited in claim 8, wherein the causing the display to present the fourth data representing the event comprises causing the display to present a cost of the item, wherein the cost is based at least in part on a weight of the item.

12. The mobile cart as recited in claim 8, wherein the receiving the third data representing the event comprises receiving the third data based at least in part on a change in weight of the basket of the mobile part based on the item being placed into or removed from the basket of the mobile cart.

13. The mobile cart as recited in claim 8, further comprising:
one or more cameras coupled to the frame and configured to generate the first data; and
one or more weight sensors coupled to the frame and configured to generate the third data.

14. The mobile cart as recited in claim 8, the acts further comprising causing the display to present fifth data representing a shopping list associated with a user operating the mobile cart.

15. One or more non-transitory computer-readable media storing computer-executable instructions that, when executed, cause one or more processors of a mobile cart to perform acts comprising:
receiving first data representing an identifier of an item placed into or removed from a basket of the mobile cart;
causing, prior to determining an event associated with the item, a display coupled to the mobile cart to present second data representing the item;
receiving, after causing the display to present the second data, third data representing the event associated with the item; and
causing after receiving the third data, the display to present fourth data representing the event.

16. The one or more computer-readable media as recited in claim 15, wherein the causing the display to present the second data comprises causing the display to present second data representing the item and indicating that the mobile cart is processing the event associated with the item.

17. The one or more computer-readable media as recited in claim 15, wherein the causing the display to present the second data representing the item comprises causing the display to present text data associated with a name of the item and image data representing the item.

18. The one or more computer-readable media as recited in claim 15, wherein the causing the display to present the fourth data representing the event comprises causing the display to present a cost of the item, wherein the cost is based at least in part on a weight of the item.

19. The one or more computer-readable media as recited in claim 15, wherein the receiving the third data representing the event comprises receiving the third data based at least in part on a change in weight of the basket of the mobile cart based on the item being placed into or removed from the basket of the mobile cart.

20. The one or more computer-readable media as recited in claim 15, wherein the first data is generated using one or more cameras coupled to the mobile cart and the third data is generated using one or more weight sensors coupled to the mobile cart.

* * * * *